United States Patent
Kazemi Miraki et al.

(10) Patent No.: US 11,174,720 B2
(45) Date of Patent: Nov. 16, 2021

(54) AUTOMATED DRILLING METHODS AND SYSTEMS USING REAL-TIME ANALYSIS OF DRILL STRING DYNAMICS

(71) Applicant: EVOLUTION ENGINEERING INC., Calgary (CA)

(72) Inventors: Mojtaba Kazemi Miraki, Calgary (CA); Aaron W. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 161 days.

(21) Appl. No.: 16/486,673

(22) PCT Filed: Feb. 22, 2018

(86) PCT No.: PCT/CA2018/050204
§ 371 (c)(1),
(2) Date: Aug. 16, 2019

(87) PCT Pub. No.: WO2018/152636
PCT Pub. Date: Aug. 30, 2018

(65) Prior Publication Data
US 2020/0011751 A1  Jan. 9, 2020

Related U.S. Application Data

(60) Provisional application No. 62/462,222, filed on Feb. 22, 2017.

(51) Int. Cl.
*E21B 47/00* (2012.01)
*E21B 47/007* (2012.01)
(Continued)

(52) U.S. Cl.
CPC ............ *E21B 47/007* (2020.05); *E21B 44/04* (2013.01); *E21B 47/024* (2013.01); *G01P 15/18* (2013.01); *E21B 7/04* (2013.01); *E21B 21/08* (2013.01)

(58) Field of Classification Search
CPC ........ E21B 47/02; E21B 47/024; E21B 47/12; E21B 47/007; E21B 44/00; E21B 44/04
See application file for complete search history.

(56) References Cited

U.S. PATENT DOCUMENTS 5,358,059 A  10/1994  Ho
5,864,058 A  1/1999  Chen
(Continued)

FOREIGN PATENT DOCUMENTS

WO  2014165389 A1  10/2014

*Primary Examiner* — Tara Schimpf
(74) *Attorney, Agent, or Firm* — Oyen Wiggs Green & Mutala LLP

(57) ABSTRACT

Methods and apparatus for identifying downhole dynamics in a drilling system are provided. Acceleration-detecting sensors are mounted at multiple locations near to a drill bit, such as at a drill collar. The sensors may be spaced 90° apart along a circumference of the drill collar. The sensors detect acceleration measurements in a plane orthogonal to the drill string's axis of rotation, with respect to a first reference frame that moves with the drill string. The acceleration measurements are received by a processor and processed to determine rotational and revolution positions of the drill string within the wellbore with respect to a static reference frame. Whirl dynamics may, in particular, be determined based on the results in real time.

24 Claims, 10 Drawing Sheets

(51) Int. Cl.
  *E21B 44/04*   (2006.01)
  *E21B 47/024*  (2006.01)
  *G01P 15/18*   (2013.01)
  *E21B 7/04*        (2006.01)
  *E21B 21/08*       (2006.01)

(56) References Cited

U.S. PATENT DOCUMENTS

| | | |
|---|---|---|
| 6,205,851 B1 | 3/2001 | Jogi |
| 6,518,756 B1 | 2/2003 | Morys et al. |
| 7,114,578 B2 | 10/2006 | Hutchinson |
| 8,775,085 B2 | 7/2014 | Reckmann et al. |
| 2011/0153217 A1 | 6/2011 | Rodney |
| 2012/0222900 A1 | 9/2012 | Rodney et al. |
| 2013/0248247 A1 | 9/2013 | Sugiura |
| 2015/0083492 A1* | 3/2015 | Wassell .................. E21B 41/00 175/24 |
| 2016/0115778 A1* | 4/2016 | van Oort ................. E21B 12/02 175/27 |
| 2016/0369612 A1 | 12/2016 | Zha et al. |

* cited by examiner

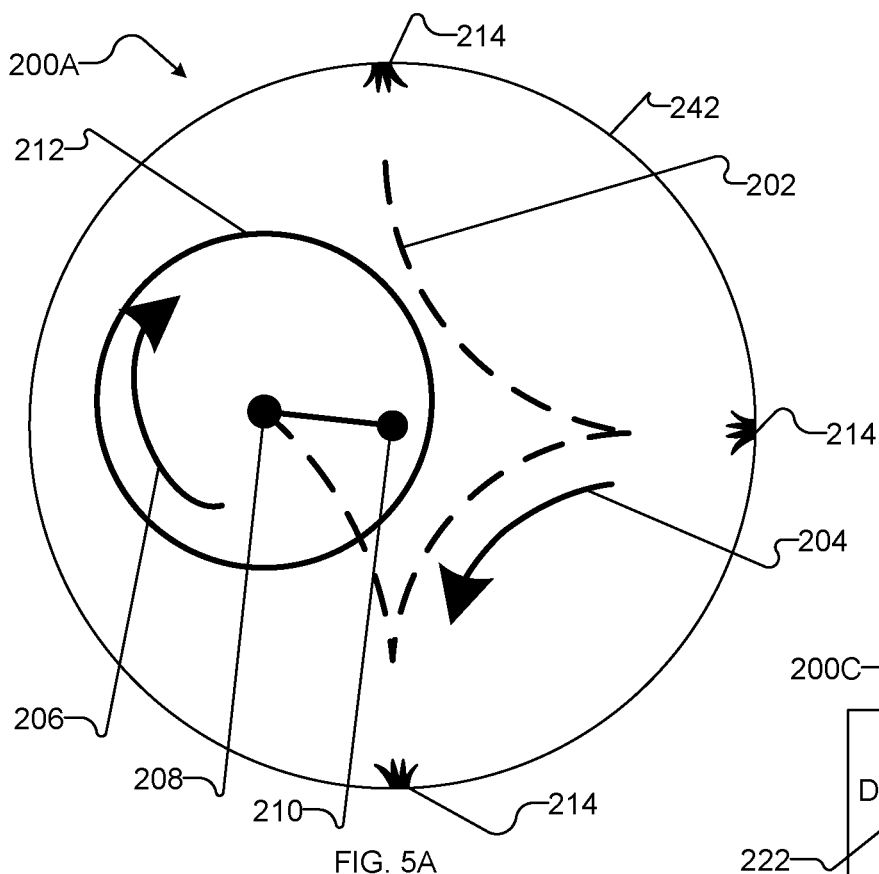
FIG. 5A
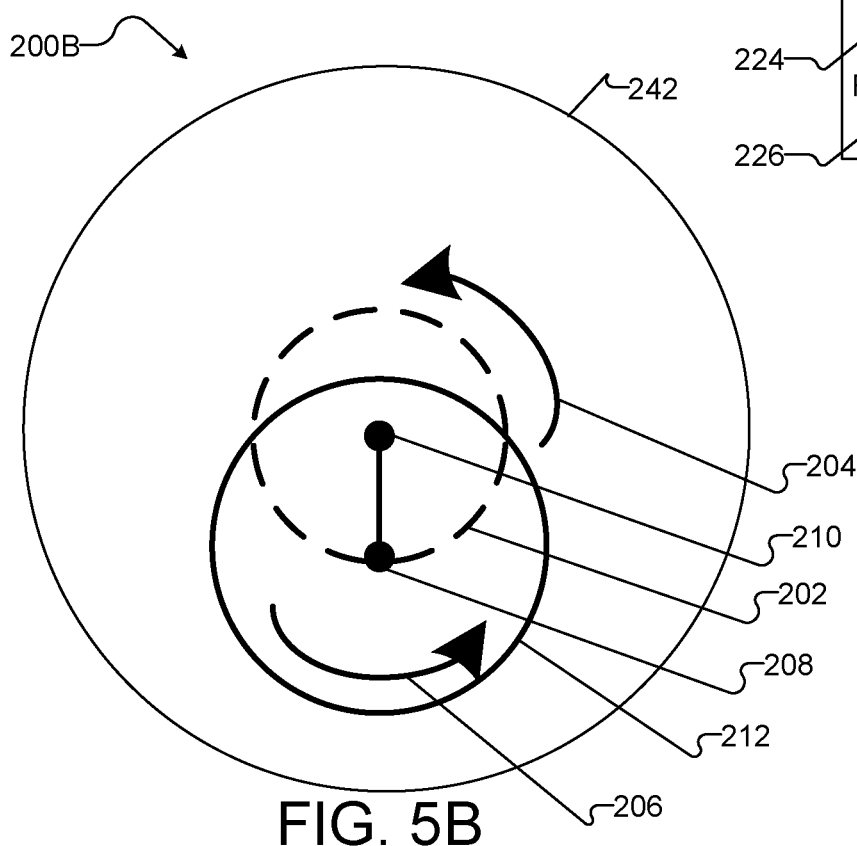
FIG. 5B
FIG. 5C

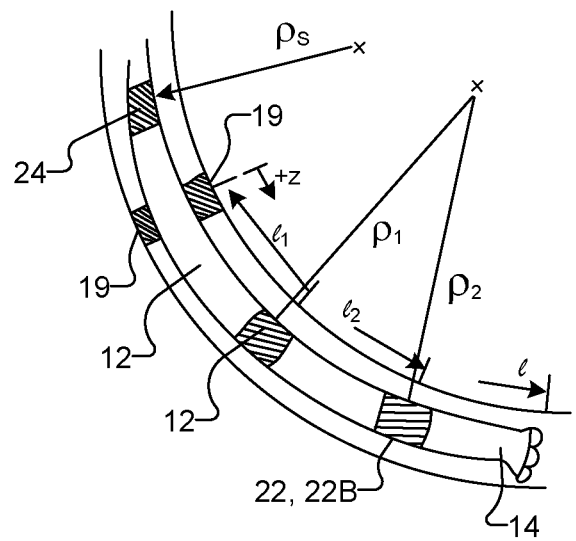
FIG. 11
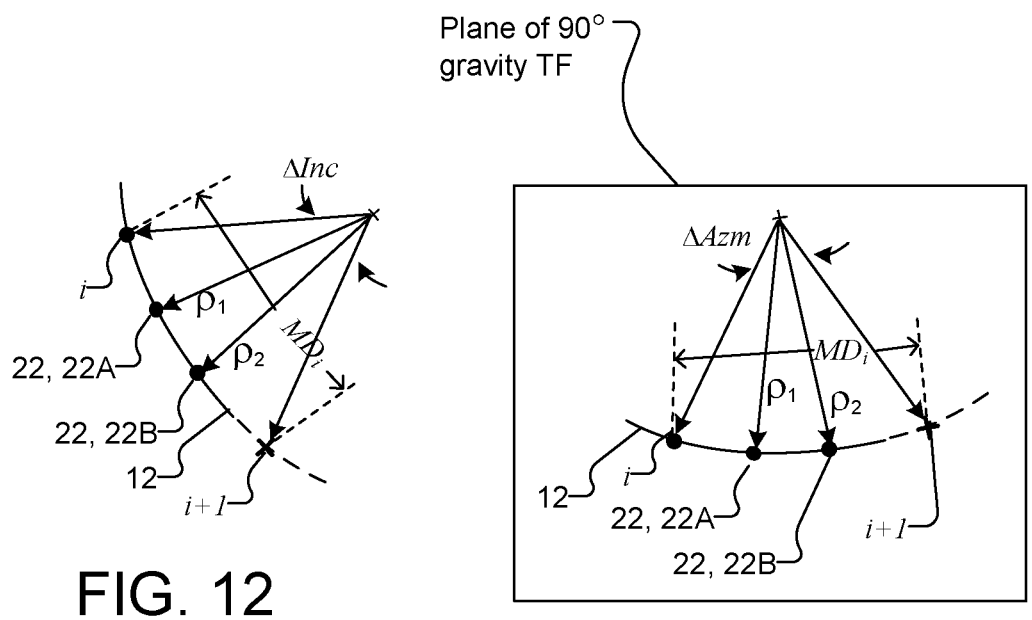
FIG. 12
FIG. 13

AUTOMATED DRILLING METHODS AND SYSTEMS USING REAL-TIME ANALYSIS OF DRILL STRING DYNAMICS

CROSS-REFERENCE TO RELATED APPLICATIONS

This application claims priority from U.S. Application No. 62/462,222 filed 22 Feb. 2017. For purposes of the United States, this application claims the benefit under 35 U.S.C. § 119 of U.S. Application No. 62/462,222 filed 22 Feb. 2017 and entitled AUTOMATED DRILLING METHODS AND SYSTEMS USING REAL-TIME ANALYSIS OF DRILL STRING DYNAMICS which is hereby incorporated herein by reference for all purposes.

TECHNICAL FIELD

This application relates to subsurface drilling and specifically to systems and methods for measuring and/or analyzing drill string dynamics. Example systems use sensors such as accelerometers. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom-Hole-Assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Downhole conditions can be harsh. Downhole equipment may experience high temperatures; vibrations (including axial, lateral, and torsional vibrations); shocks; immersion in drilling fluids; high pressures (20,000 p.s.i. or more in some cases); turbulence and pulsations in the flow of drilling fluid; fluid initiated harmonics; and torsional acceleration events from slip which can lead to side-to-side and/or torsional movement of the downhole equipment. These conditions can shorten the lifespan of downhole equipment and can increase the probability that downhole equipment will fail in use. Replacing downhole equipment that fails while drilling can involve very great expense. In addition, the components of a drill string can become worn and/or damaged by exposure to downhole conditions.

One type of downhole condition which may be particularly harmful is known as drill string whirl (or simply "whirl"). Whirl is one of the primary causes of failure in downhole systems. Whirl occurs when the drill string itself revolves about an axis (other than its axis of rotation) within the wellbore. There are several types of whirl, including forward whirl (where the direction of rotation is the same as the direction of revolution), forward synchronous whirl (in which the direction and rate of rotation are the same as the direction and rate of revolution), and backward whirl (in which the direction of rotation opposes the direction of revolution). Backward whirl is generally considered to have significantly more potential for harming downhole equipment than other types of whirl. Whirl can result from a variety of factors, such as sag, bending, deflections, mass imbalance, fluid forces, interaction between the drill bit and a formation, friction between the drill string and a wall of the wellbore, and/or other factors.

There is a general desire for systems and methods operable to identify and characterize whirl in a drilling system in real time. There is also a need for systems and methods for controlling drilling operations in a manner that reduces or eliminates adverse effects of whirl.

The foregoing examples of the related art and limitations related thereto are intended to be illustrative and not exclusive. Other limitations of the related art will become apparent to those of skill in the art upon a reading of the specification and a study of the drawings.

SUMMARY

This invention has a number of aspects. These aspects may be applied in combination but may also be applied individually. These aspects include, without limitation:
- Apparatus for monitoring drill string dynamics, such as whirl;
- Downhole sensor units;
- Apparatus for effectively communicating features of drill string dynamics to an operator;
- Methods for monitoring drill string dynamics;
- Methods for effectively communicating features of drill string dynamics to an operator;
- Drilling control apparatus having automatic systems for reducing damaging effects of whirl and/or controlling the dynamics of the Bottom-Hole-Assembly (BHA);
- Methods for controlling drilling operations to reduce damaging effects of whirl and/or controlling the dynamics of the Bottom-Hole-Assembly (BHA).

One aspect of the invention provides drilling systems and methods for real-time identification of downhole dynamics in a drilling system. The system comprises a plurality of sensors mounted to a drill string at a plurality of sensor locations. The sensors are configured to sense a plurality of acceleration measurements corresponding to a plurality of locations in a first two-dimensional reference frame. The first two-dimensional reference frame is coincident with a plane orthogonal to a rotational axis of the drilling system and based on a position of the drilling system in the plane. The plurality of acceleration measurements comprise measurements in a plurality of non-parallel directions lying in the plane. The system further comprises a processor in communication with the plurality of sensors. The processor is configured to perform the steps of the method described herein.

The method is performed by the processor and comprises receiving, by the processor, a plurality of acceleration measurements corresponding to a plurality of locations in a first two-dimensional reference frame. The method further comprises determining, by the processor, a rotational position of the drilling system in the first two-dimensional reference frame based on the plurality of acceleration measurements. The rotational position describes rotation of the drilling system in the plane about the rotational axis. The method further comprises converting, by the processor, a first location of the plurality of locations to a corresponding second location of the drilling system in a second two-dimensional reference frame based on the plurality of acceleration measurements. The second two-dimensional reference frame is coincident with the first plane and invariant with the position of the drilling system in the plane. The method further comprises determining, by the processor, a revolution position of the drilling system in the second two-dimensional reference frame based on the rotational position and the second location. The revolution position describes revolution of the drilling system in the plane about a revolution axis. The method further comprises identifying, by the processor, a whirl dynamic of the drilling system based on the revolution position.

In some embodiments, converting the first location in the first two-dimensional reference frame to the corresponding second location in the second two-dimensional reference frame comprises determining, by the processor, a converted plurality of acceleration measurements in the second two-dimensional reference frame based on the first location and the rotational position. The conversion further comprises determining, by the processor, the second location in the second two-dimensional reference frame based on at least one of the plurality of locations and the converted plurality of acceleration measurements.

In some embodiments, converting the first location in the first two-dimensional reference frame to the corresponding second location in the second two-dimensional reference frame comprises determining, by the processor, a planar velocity in the second two-dimensional reference frame. The planar velocity corresponds to the second location and is based on the converted plurality of acceleration measurements. Determining the second location comprises determining, by the processor, the second location based on the planar velocity.

In some embodiments, determining a rotational position comprises determining, by the processor, a rotational velocity of the drilling system in the first two-dimensional reference frame based on the plurality of acceleration measurements and determining, by the processor, the rotational position based on the rotational velocity. In some embodiments, the method further comprises determining, by the processor, a rotational acceleration in the first two-dimensional reference frame based on the rotational velocity.

In some embodiments, identifying the whirl dynamic comprises identifying the whirl dynamic based on a revolution velocity. The method further comprises determining, by the processor, the revolution velocity of the drilling system in the second two-dimensional reference frame based on the revolution position. In some embodiments, identifying the whirl dynamic comprises identifying the whirl dynamic based on a revolution acceleration and the method further comprises determining, by the processor, the revolution acceleration of the drilling system in the second two-dimensional reference frame based on the revolution velocity.

In some embodiments, the first location comprises a first sensor location of a first sensor 22A. A first measurement subset of the plurality of acceleration measurements are sensed by first sensor 22A. The first sensor location is spaced apart from the rotational axis by a known first radius $R_A$.

A second measurement subset of the plurality of acceleration measurements are sensed by a second sensor 22B. Second sensor 22B senses accelerations at a second sensor location spaced apart from the rotational axis by a known second radius $R_B$ and spaced apart from the first sensor location.

In some embodiments, the first sensor location is angularly offset from the second sensor location by 90° relative to the rotational axis. Such embodiments are particularly convenient because calculations are simplified. This can be important where data from sensors 22 is processed by downhole processors which may have limited computational power and/or limited available electrical power.

The first measurement subset may comprise a first radial acceleration measurement $\alpha_{RA}$ along a first measurement axis parallel to the first radius $R_A$ and a first tangential acceleration measurement $\alpha_{\theta A}$ along a second measurement axis orthogonal to the first measurement axis. The measurements of the first subset may, for example, be obtained using a two axis accelerometer for first sensor 22A. The second measurement subset comprises a second radial acceleration measurement $\alpha_{RB}$ along a third measurement axis parallel to the second measurement axis and a second tangential acceleration measurement $\alpha_{\theta R}$ along a fourth measurement axis parallel to the first measurement axis. The measurements of the second subset may, for example, be obtained using a two axis accelerometer for second sensor 22B.

In some embodiments, determining the rotational position comprises determining, by the processor, the rotational position at a time $t_n$ based on an incremental change in the rotational position since a prior time $t_{n-1}$ and a prior rotational position corresponding to the prior time $t_{n-1}$. In some embodiments, the rotational velocity comprises an angular rotational velocity $d\theta/dt$ and determining the rotational velocity comprises determining, by the processor, the angular rotational velocity $d\theta/dt$ based on:

$$\left(\frac{d\theta}{dt}\right)^2 = \frac{-(a_{RA} - a_{\theta B})R_A + (a_{\theta A} - a_{RB})R_B}{R_A^2 + R_B^2}$$

In some embodiments, the rotational position corresponding to the time $t_n$ comprises an angular rotational position $\theta(t_n)$ and the prior rotational position comprises a prior angular rotational position $\theta(t_{n-1})$. The method further comprises determining, by the processor, the angular rotational position $\theta(t_n)$. This may be done, for example, by performing calculations based on:

$$\theta(t_n) = \frac{1}{2}\left[\frac{d\theta}{dt}(t_n) + \frac{d\theta}{dt}(t_{n-1})\right](t_n - t_{n-1}) + \theta(t_{n-1})$$

wherein $$\frac{d\theta}{dt}(t_n)$$

is the angular rotational velocity corresponding to the time $t_n$ and $$\frac{d\theta}{dt}(t_{n-1})$$

is the angular rotational velocity corresponding to a time $t_{n-1}$.

In some embodiments, the second two-dimensional reference frame comprises a first axis X and a second axis Y orthogonal to the first axis. The converted plurality of acceleration measurements comprise: a first converted measurement $(\alpha_A)_X$ comprising a projection of the first measurement subset onto the first axis X and a second converted measurement $(\alpha_A)_Y$ comprising a projection of the first measurement subset onto the second axis Y. In some embodiments, the method further comprises determining, by the processor, the first converted measurement $(\alpha_A)_X$ based on $(\alpha_A)_X = \alpha_{RA} \cos\theta - \alpha_{\theta A} \sin\theta$ and determining, by the processor, the second converted measurement $(\alpha_A)_Y$ based on $(\alpha_A)_Y = \alpha_{RA} \sin\theta + \alpha_{\theta A} \cos\theta$.

In some embodiments, the second location comprises a first coordinate $X_A$ on the first axis X and a second coordinate $Y_A$ on the second axis Y. Determining a revolution position may be done, for example, by determining, by the processor, a revolution radius $r_G$ and a revolution angle $\phi$ based on the first and second coordinates. In some embodiments, determining the revolution radius $r_G$ comprises determining, by the processor, the revolution radius $r_G$ based on:

$$r_G = \sqrt{(Y_A \sin\theta + X_A \cos\theta - R_A)^2 + (Y_A \cos\theta - X_A \sin\theta)^2}$$

In some embodiments, determining the revolution angle $\phi$ comprises determining, by the processor, the revolution angle $\phi$ based on:

$$\phi = \theta - \sin^{-1}\left[\frac{Y_A \cos\theta - X_A \sin\theta}{r_G}\right]$$

In some embodiments, the method comprises transmitting, by the processor, at least one of: the plurality of acceleration measurements, the rotational position, and the revolution position to an at-surface processor. In some embodiments, the method further comprises presenting, by the at-surface processor, the whirl dynamic to a user based on the revolution position.

Another aspect of the invention provides drilling systems and methods operable to provide real-time identification of downhole dynamics in a drilling system. The drilling system comprises a first sensor mounted to a drill string of the drilling system at a first sensor location in a plane orthogonal to a rotational axis of the drilling system. The first sensor is configured to sense a first acceleration measurement comprising a first radial acceleration measurement $\alpha_{RA}$ along a first measurement axis parallel to the first radius $R_A$ and a first tangential acceleration measurement $\alpha_{\theta A}$ along a second measurement axis orthogonal to the first measurement axis. The drilling system further comprises a second sensor mounted to the drill string of the drilling system at a second sensor location in the plane. The second sensor location is spaced apart from the rotational axis by a second radius $R_B$ and spaced apart from the first sensor location in the plane. The second sensor is configured to sense a second acceleration measurement comprising a second radial acceleration measurement $\alpha_{RB}$ along a third measurement axis parallel to the second measurement axis and a second tangential acceleration measurement $\alpha_{\theta R}$ along a fourth measurement axis parallel to the first measurement axis. The system further comprises a processor in communication with the first and second sensors, the processor configured to identify a downhole dynamic of the drilling system based on the first and second acceleration measurements. The processor is configured to perform the steps of the method described herein.

The method is performed by a processor in communication with a first sensor and a second senor, and comprises receiving, by the processor, a first acceleration measurement from the first sensor and a second acceleration measurement from the second sensor as described above. The method further comprises identifying, by the processor, a downhole dynamic of the drilling system based on the first and second acceleration measurements.

In some embodiments, the method comprises converting, by the processor, the first sensor location to a corresponding converted location of the drilling system in a second two-dimensional reference frame based on the first and second acceleration measurements. The second two-dimensional reference frame is coincident with the plane and invariant with the position of the drilling system in the plane. The method further comprises determining, by the processor, a revolution position of the drilling system in the second two-dimensional reference frame based on the converted location. The revolution position describes revolution of the drilling system in the plane about a revolution axis. Identifying the downhole dynamic comprises identifying, by the processor, a whirl dynamic based on the revolution position.

In some embodiments, these further systems and methods comprise any feature or combination of features described above with respect to the previously-described systems and methods.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 5A is an example graphical display of an example downhole dynamic exhibiting impacting between a drill string and a wellbore surface.

FIG. 5B is an example graphical display of an example downhole dynamic without substantial impacting.

FIG. 5C is an example textual display corresponding to the downhole dynamic of FIG. 5B.

FIG. 11 illustrates exemplary measurements that can be made to estimate curvature in a drill string.

FIGS. 12 and 13 illustrate directional parameters inclination and azimuth, respectively, which can be predicted from real time curvature estimates in accordance with particular embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
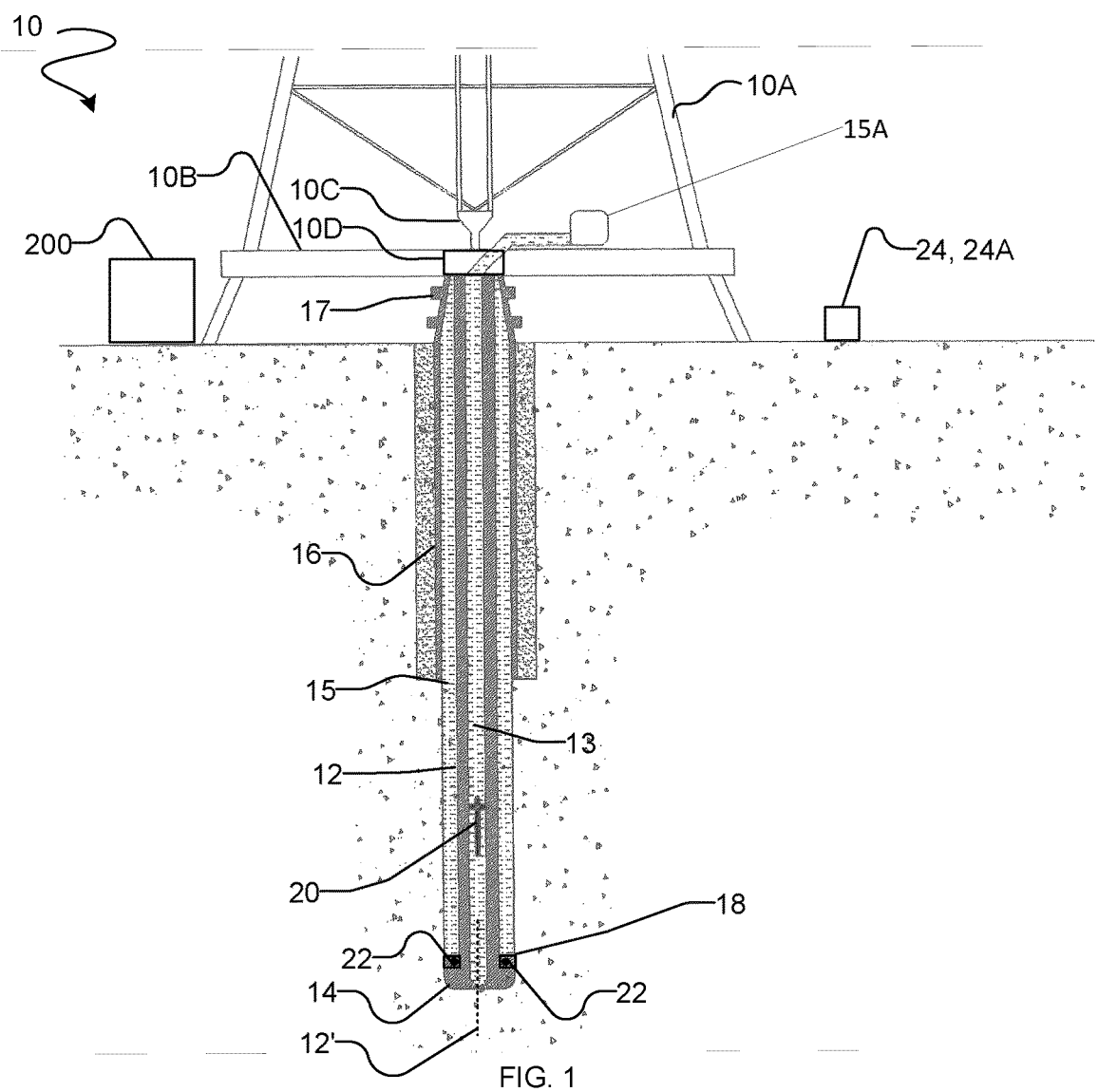
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B, draw works 10C for supporting the drill string, and a top drive 10D for driving the drill string. Alternatively, the drill string may be driven by a rotary table, or a Rotary Steerable System. Drill bit 14 is larger in diameter than drill string 12 above the drill bit. An annular region 15 surrounding the drill string is typically filled with drilling fluid. The drilling fluid is pumped by pump 15A through a bore 13 in drill string 12 to drill bit 14 and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

One aspect of the invention provides apparatus which includes downhole sensors. Signals from the downhole sensors are processed to characterize motion of the drill string. The processing may provide output that characterizes whirl in the drill string. This characterizing information may include general qualitative information such as: whether whirl over a minimal amount is occurring, if so, the direction of such whirl, whether or not the whirl is causing contact between the drill string and the borehole wall, whether the magnitude of the whirl is in one or more broad ranges, whether the whirl is increasing or decreasing, and/or whether the whirl is of or is trending toward a magnitude such that damage to the drill string is likely to occur. The characterizing information may include quantitative information such as the rate of rotation of the drill string, the rate of whirling motion, a location of the center of whirl, a rate of change of the whirl and so on. In some embodiments whirl is fully characterized.

Sensors 22 provided by embodiments of the present disclosure may be located at any suitable distance(s) along drill string 12. The sensors may be housed in any suitable way such as within one or more downhole probes 20, within a pocket or housing forming part of the drill string, within a package attached to the drill string etc. Parts of the following description use the illustrative case in which sensors 22 are housed in probes located in a bore of the drill string. However, these embodiments may all be modified to provide sensors housed in other structures. For example, sensors may be housed in subs that form part of the drill string, in compartments formed within the walls of drill collars, drill bits or other drill string components and/or in packages attached on the outside of drill string components. In some embodiments sensors 22 are mounted in a drill bit 14.

A probe 20 in drill string 12 may comprise a variety of sensors, such as accelerometers, magnetometers, radiation sensors, etc. Probe 20 is typically positioned at a distance from drill bit 14, as drill bit 14 may interfere with certain sensors (particularly magnetometers). A drill collar 18 is commonly provided in drill string 12 proximate to drill bit 14, for structural support and weight.

Figure 2:
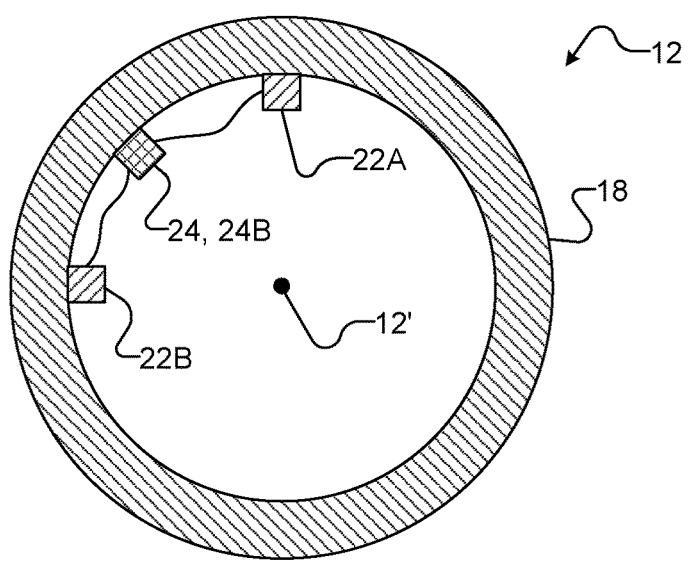
FIG. 2 is a schematic cross-sectional view of an example drill string having sensors for identifying downhole dynamics according to an example embodiment.
Figure 2A:
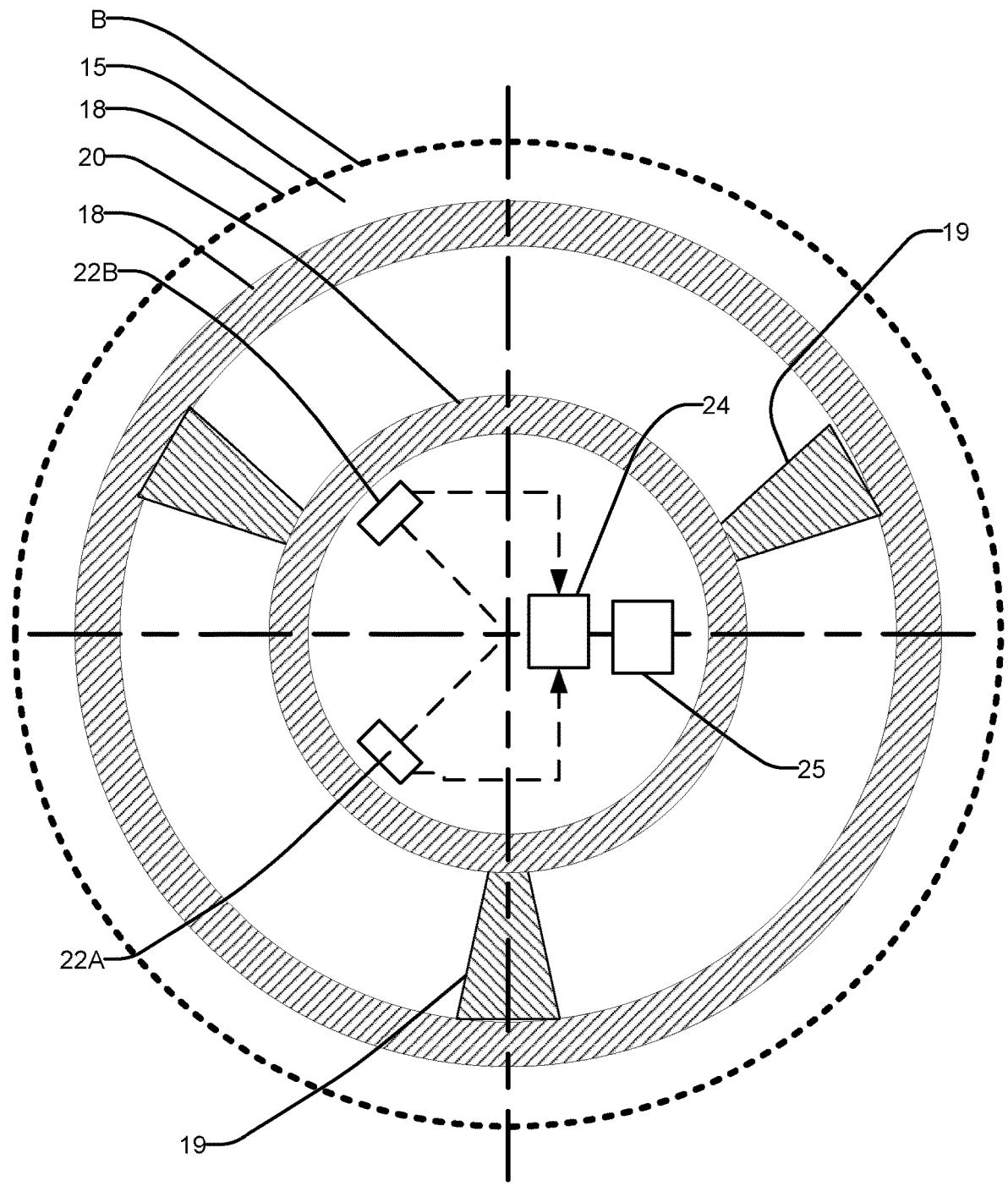
FIG. 2A is a schematic cross-sectional view of an example embodiment providing sensors in a downhole probe.

In some embodiments, at least some sensors 22 are provided proximate to drill bit 14. For example, sensors 22 may be provided at a drill collar 18 near to drill bit 14. FIG. 2 shows an example embodiment in which two sensors 22A and 22B (collectively and individually, sensors 22) are attached to a drill collar 18. FIG. 2A shows another example embodiment in which two sensors 22A and 22B (collectively and individually, sensors 22) are provided in a probe 20. In the illustrated embodiment, probe 20 is held centralized in bore 13 of drill collar 18 (or some other part of drill string 12) by features 19. Providing sensors 22A and 22B and associated equipment such as a data communication system and/or data processor in a probe 20 is convenient because this packaging facilitates easy manufacturing, calibration and landing/removing of apparatus comprising sensors 22A and 22B. The probe may include a pressure-tight housing that encloses and protects sensors 22 and associated equipment.

Sensors 22 are in communication with a processor. Outputs from sensors 22 are processed by suitable signal conditioning as is known to those of skill in the art. The signal conditioning may, for example, eliminate noise and/or remove unwanted parts of the output signals. Signal conditioning may, for example, include filtering, amplification, comparison with reference signals and/or other sensor output signals, peak limiting, differentiation, etc. Signal conditioning may be performed in the analog and/or digital domains.

The processor may be an at-surface processor 24A (e.g. as shown in FIG. 1), a downhole processor 24B (e.g. as shown in FIG. 2), and/or a plurality of processors (which may be a combination of at-surface and/or downhole processors 24A, 24B). The one or more processors that process signals from sensors 22 (e.g. processors 24A and 24B) are described generally and collectively as processor 24. Processor 24 receives acceleration measurements from sensors 22 via a communication link (e.g. via a wired or optical connection, via a telemetry system, and/or by any other suitable communication link). Processor 24 identifies a downhole dynamic based on the acceleration measurements. For example, downhole processor 24B may receive acceleration measurements from sensors 22, perform a method described herein to identify downhole dynamics, and transmit results produced by the method to at-surface processor 24A. At-surface processor 24A may cause the results to be displayed to an operator of the drilling operation and/or may apply the results to control one or more aspects of the drilling operation.

As another example, sensors 22 may provide acceleration measurements to a telemetry system 25, e.g. via downhole processor 24B, which may transmit the acceleration measurements or values derived from the acceleration measurements to at-surface processor 24A. At-surface processor 24A may perform all or part of the method described herein to identify downhole dynamics.

FIG. 2 is a schematic cross-sectional diagram of an example drill string 12. Although either perspective may be adopted, it will be assumed (for the sake of convenience) that the cross-sectional diagrams of FIGS. 2, 2A and 3 take the perspective of an observer facing towards drill bit 14 (i.e. facing downhole). Drill string 12 comprises a drill collar 18 to which two sensors, a first sensor 22A and a second sensor 22B (collectively and generally, sensors 22), are mounted. Sensors 22 are configured to take acceleration measurements. In some embodiments, sensors 22 comprise bidirectional (e.g. two-axis or three-axis) accelerometers.

In the illustrated embodiment, sensors 22A and 22B are located equidistant from a centerline 12' of drill string 12 and are angularly spaced apart by a known angle relative to centerline 12'. Each of sensors 22 senses acceleration in a radial direction and a perpendicular tangential direction. It is convenient to mount sensors 22 such that a first measurement axis is on and aligned with a radius of a drill collar or other drill string component in which the sensor 22 is supported and another measurement axis is perpendicular to the first measurement axis and lies in a plane perpendicular to a longitudinal centerline of the drill string component (i.e. in a transverse plane of the drill string component). This allows direct reading of acceleration components in the directions of the measurement axes. In other embodiments acceleration components in the directions of these measurement axes are computed from acceleration measurements made in other directions.

In certain preferred embodiments, sensors 22A and 22B are angularly spaced by 90°. This geometry facilitates efficient characterization of whirl as described below. Providing a physical arrangement of sensors 22 that facilitates computational efficiency in determining parameters of drill string dynamics can facilitate such parameters to be computed at a downhole location where one or both of electrical power and computational power may be in limited supply.

In some embodiments, each sensor 22 comprises a plurality of accelerometers. For example, each sensor 22 may comprise two single-axis accelerometers positioned orthogonally to each other. In other embodiments each sensor 22 comprises a multi-axis accelerometer. In some embodiments, more than two sensors 22 are provided. For example, three or four sensors 22 may be mounted to drill collar 18 (e.g. radially spaced apart around an inner circumference of drill collar 18 with known angular separations between the sensors 22. In such embodiments it is convenient and efficient but not mandatory to make the sensors 22 equally spaced-apart angularly. For example, four sensors 22 may be angularly spaced apart at 90° increments or three sensors 22 may be angularly spaced apart at 120° increments.

Figure 3:
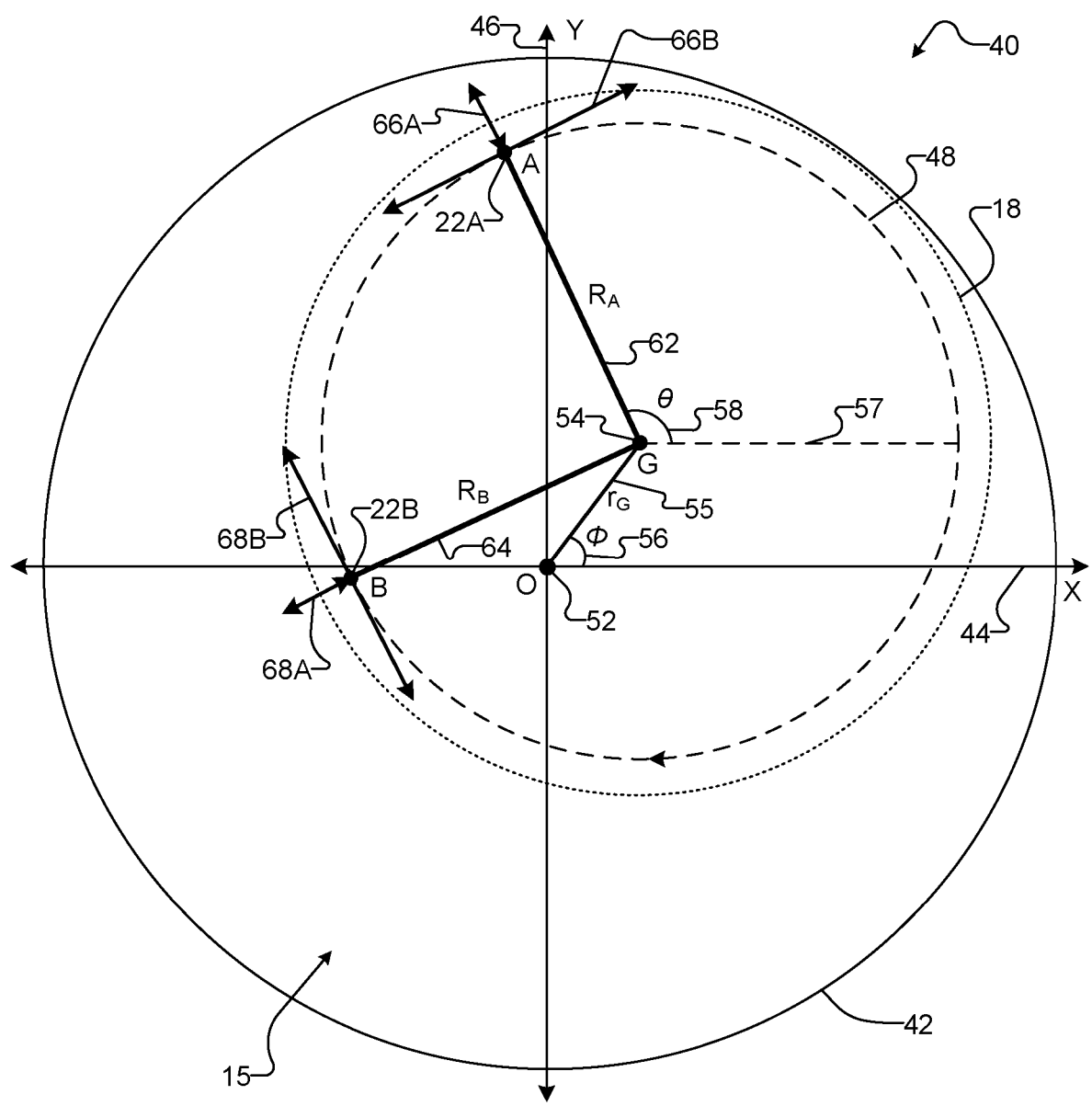
FIG. 3 is a schematic cross-sectional view of an example drill string while experiencing whirl in a wellbore according to an example embodiment.

FIG. 3 is a schematic cross-sectional diagram of a downhole system 40 according to an example embodiment. Drill string 12 (and thus drill collar 18, in embodiments where sensors 22 are mounted to drill collar 18) is shown inside a wellbore 42. As drill collar 18 rotates, sensors 22 travel along sensor path 48. Sensors 22 sense acceleration in a moving reference frame fixed to and defined by the orientation of drill string 12. In order to characterize whirl, embodiments of the present disclosure determine the motion of drill string 12 relative to wellbore 42. In particular, some embodiments define a static reference frame. The static reference frame may have an origin and orientation defined relative to wellbore 42, relative to an expected (non-rotating) position of drill string 12, relative to an arbitrary, pre-selected point, and/or relative to any other suitable location. In some embodiments, the static reference frame is defined by a first axis 44 (denoted X in FIG. 3) and a second, orthogonal axis 46 (denoted Y in FIG. 3).

Preferably the static reference frame is oriented such that axes 44, 46 lie in a transverse plane of drill string 12 (a plane perpendicular to the longitudinal centerline of drill string 12 at the position of sensors 22). Preferably one axis of the static reference frame is aligned in a direction that is relevant to the drilling operation. This axis may be arranged in any of various ways. By way of non-limiting example, the direction may be north (magnetic, true, or grid north) or a direction of the high side of an inclined wellbore. In some embodiments the orientation of the static reference frame depends on the inclination of the wellbore. For example, if the inclination of the wellbore at the location of sensors 22 is less than a threshold amount (e.g. 5° or less relative to vertical) an axis of the static reference frame may be aligned in a chosen compass direction such as a north-south direction. If the inclination of the wellbore exceeds the threshold amount then the static reference frame may be constructed such that one axis is parallel to the direction from the center of the wellbore to the highside (highside is defined at the "up" point in the cross-section of the drill string, i.e. opposite to the direction of gravity field) of the wellbore. In other embodiments the static reference frame may have an arbitrary (but known) orientation relative to these directions.

As noted above, drill string dynamics may be determined from measurements of accelerations along directions in a transverse plane. At the longitudinal position of sensors 22 drill string 12 rotates about a point in this plane. It is not typically necessary to consider the motion of drill string 12 outside of this two-dimensional transverse plane of rotation. The moving and stationary reference frames can be defined as two-dimensional reference frames lying in the transverse plane.

Downhole dynamics of drill string 12 may thus be identified with bidirectional sensors (e.g. bidirectional accelerometers), without necessarily requiring three-dimensional sensors (e.g. three-dimensional accelerometers). In some embodiments, three-dimensional sensors are provided, and acceleration measurements in the two-dimensional plane are derived from the sensors' three-dimensional measurements. The plane coincident with the moving and static reference frames may be referred to as the 'measurement plane'.

In some embodiments sensors 22 are sensitive to acceleration in a direction that allows the inclination of the drill string to be determined. In other embodiments, the apparatus includes one or more additional sensors for determining drill string inclination (e.g. an additional accelerometer with one of its sensitive axis aligned with the axis of the wellbore and positioned in the center of a drill collar). Inclination may be calculated using the relationship:

$$Inc = \cos^{-1}\left(\frac{g_z}{g}\right) \quad (1)$$

Where Inc is inclination, $g_z$ is the magnitude of earth's gravity field in the direction of wellbore (drill string), and g is the total gravity field. g can be measured in the apparatus using a multi-axis accelerometer or a value for g may be supplied from an external source such as another downhole tool such as a directional survey package. In the alternative, inclination information may be supplied from an external source.

In the example scenario depicted in FIG. 3, drill string 12 is rotating about its longitudinal rotational axis 54 (denoted G in FIG. 3) in a clockwise motion. If processor 24 determines that rotational axis 54 is moving (e.g. orbiting around a point in the static reference frame), then processor 24 may determine that drill string 12 is experiencing whirl. In the depicted scenario, the longitudinal axis 54 of drill string 12 is revolving around a revolution axis 52 (denoted O in FIG. 3) in the static reference frame. Revolution axis 52 is orthogonal to the measurement plane.

The dynamics of the drill string may be characterized for example by: the rate at which the drill string is rotating about its own axis 54; the radius as measured from the center of the borehole to the longitudinal axis 54 of the drill string; the angle θ of rotation of the drill string; the angle φ made between a line joining the center of the borehole to the longitudinal axis 54 of the drill string and a reference direction; and first and second derivatives of each of these quantities.

If processor 24 determines that the longitudinal axis of drill string 12 is revolving along some orbit in a counter-clockwise motion in the transverse plane of rotation then processor 24 may determine that drill string 12 is experiencing backward whirl (recall that drill string 12 is rotating about rotational axis 54 in a clockwise motion in this example). In backward whirl the direction of rotation of drill string 12 about its own longitudinal axis 54 and the direction of rotation of the longitudinal axis 54 of drill string 12 in some orbit in the transverse plane are opposite to one another. If processor 24 determines that longitudinal axis 54 of drill string 12 is revolving along some orbit in the transverse plane in a clockwise motion, then processor 24 may determine that drill string 12 is experiencing forward whirl. If processor 24 determines that drill string 12 is experiencing forward whirl such that a particular point along the circumference of drill string 12 remains close to the wall of wellbore 42 (that is, if the rates and directions of revolution and rotation are substantially the same), then processor 24 may determine that drill string 12 is experiencing forward synchronous whirl.

Thus, maintaining a model of the current position and orientation of drill string 12 within wellbore 42 relative to the static reference frame may be of great assistance in determining the type of whirl (if any) being experienced by drill string 12. This can be important since certain whirl modes, particularly backward whirl, can be damaging to drill string 12. An operator of drill string 12 may use information identifying such whirl dynamics to adjust the drilling operation, e.g. to prevent, reduce or eliminate backward whirl. Such information may further be useful in identifying other important downhole dynamics, such as stick-slip (where the rotational velocity of drill bit 14 and/or downhole portions of drill string 12 temporarily drops to a zero or near-zero value), RPM, drill string vibrations, etc.

The position and orientation of drill string 12 may be described at a particular moment in time by its revolution angle 56 (i.e. the angle by which rotational axis 54 is offset from first axis 44 relative to revolution axis 52—denoted φ), its revolution radius 55 (i.e. the distance between revolution axis 52 and rotation axis 54—denoted $r_G$), and its rotational angle 58 (i.e. the angle of its rotation about rotational axis 54—denoted θ). Each of these values may change over time, and so may equivalently be denoted $\phi(t)$, $r_G(t)$, and $\theta(t)$ at a given time t. This information can be processed at a downhole location and/or transmitted to the surface in a real-time fashion. At the surface the information may be presented in various ways, including numerically and/or in the form of plots of bit position in the hole. This information may additionally or in the alternative be applied to control the quality of the wellbore being drilled (e.g. to reduce $r_G(t)$ or ideally make it zero) and/or to reduce motions that could tend to damage drill string components.

In some embodiments, rotational angle 58 is the angle at which first sensor 22A is offset from a reference axis 57. Reference axis 57 may have a known orientation in the static reference frame. For example, reference axis 57 may be parallel to first axis 44. The orientation of reference axis 57 does not necessarily need to be stored or calculated on an ongoing basis. An initial value $\theta(t_0)$ of rotational angle 58 may be set to 0 or another arbitrarily chosen angle (thus defining reference axis 57 based on an initial position of drill string 12) or to any other suitable number. As drill string 12 rotates, processor 24 may record incremental changes to rotational angle 58 by interpreting acceleration measurements, thereby enabling rotational angle 58 to be determined relative to the static reference frame based solely on measurements obtained in the moving reference frame. In some embodiments, first axis 44 is defined to be coincident with reference axis 57 at initial time $t_0$.

Each sensor 22 is spaced apart from rotational axis 54. Each sensor 22 thus has a corresponding radius $R_i$ between it and rotational axis 54. For example, in the depicted embodiment, first sensor 22A has a corresponding first radius 62 (denoted $R_A$) and second sensor 22B has a corresponding second radius 64 (denoted $R_B$). $R_A$ and $R_B$ may be the same (which is convenient) or different. In some embodiments, reference axis 57 is defined to be coincident with first radius 62 at an initial time $t_0$.

Each sensor 22 senses accelerations, as described herein. Acceleration sensed by first sensor 22A may be denoted $\alpha_A$ and acceleration sensed by second sensor 22B may be denoted $\alpha_B$. Each measurement $\alpha_A$, $\alpha_B$ may comprise one or more component measurements; for example, where sensors 22 are bidirectional accelerometers, each measurement $\alpha_A$, $\alpha_B$ may comprise measurements along first and second axes (and these axes may differ between measurements $\alpha_A$ and $\alpha_B$).

In the depicted embodiment, first sensor 22A senses acceleration along a first radial axis 66A and a first tangential axis 66B (collectively first sensor axes 66). First radial axis 66A extends in substantially the same direction as first radius 62, and first tangential axis 66B extends orthogonally to first radial axis 66A. Accelerations sensed by first sensor 22A along first radial axis 66A may be denoted $\alpha_{RA}$ (or, equivalently, $(\alpha_A)_{RA}$), and measurements sensed by first sensor 22A along first tangential axis 66B may be denoted $a_{\theta A}$ (or, equivalently, $(\alpha_A)_{\theta A}$). Measurement $\alpha_A$ thus comprises $\alpha_{RA}$ and $\alpha_{\theta A}$, although measurement $\alpha_A$ may be represented in any suitable form; for example, measurement $\alpha_A$ may be represented in polar coordinates (as an angle and magnitude), in Cartesian coordinates, and/or in any other suitable form.

Similarly, in the depicted embodiment, second sensor 22B senses acceleration $\alpha_{RB}$ along a second radial axis 68A and $\alpha_{\theta B}$ along a second tangential axis 68B (collectively second sensor axes 68). Second radial axis 68A is parallel to (but not coincident with) first tangential axis 66B, and second tangential axis 68B is parallel to (but not coincident with) first radial axis 66A. First sensor axes 66 measure acceleration experienced by drill string 12 at a point A corresponding to first sensor 22A, and second sensor axes 68 measure acceleration experienced by drill string 12 at a point B corresponding to second sensor 22B. Points A and B are spaced apart in the measurement plane. By comparing accelerations experienced at these coplanar points (and/or, in some embodiments, other points), the position and orientation of drill string 12 may be derived.

In some embodiments, sensors 22 may sense acceleration along axes other than, or in addition to, first axes 66 and/or second axes 68. In such embodiments, acceleration measurements along axes 66, 68 may be derived, for example, by calculating the projections of acceleration measurements $\alpha_A$, $\alpha_B$ onto axes 66, 68, respectively. Such a calculation may be performed as a preliminary step (prior to subsequent calculation of the position and orientation of drill string 12) and/or implicitly as part of subsequent calculations.

The accelerations sensed by sensors 22 may be used to characterize downhole dynamics of the drilling system. For example, as discussed in greater detail below, the acceleration measurements may be used to determine a whirl characteristic (e.g. backward whirl, forward whirl, and/or forward synchronous whirl).

Figure 4:
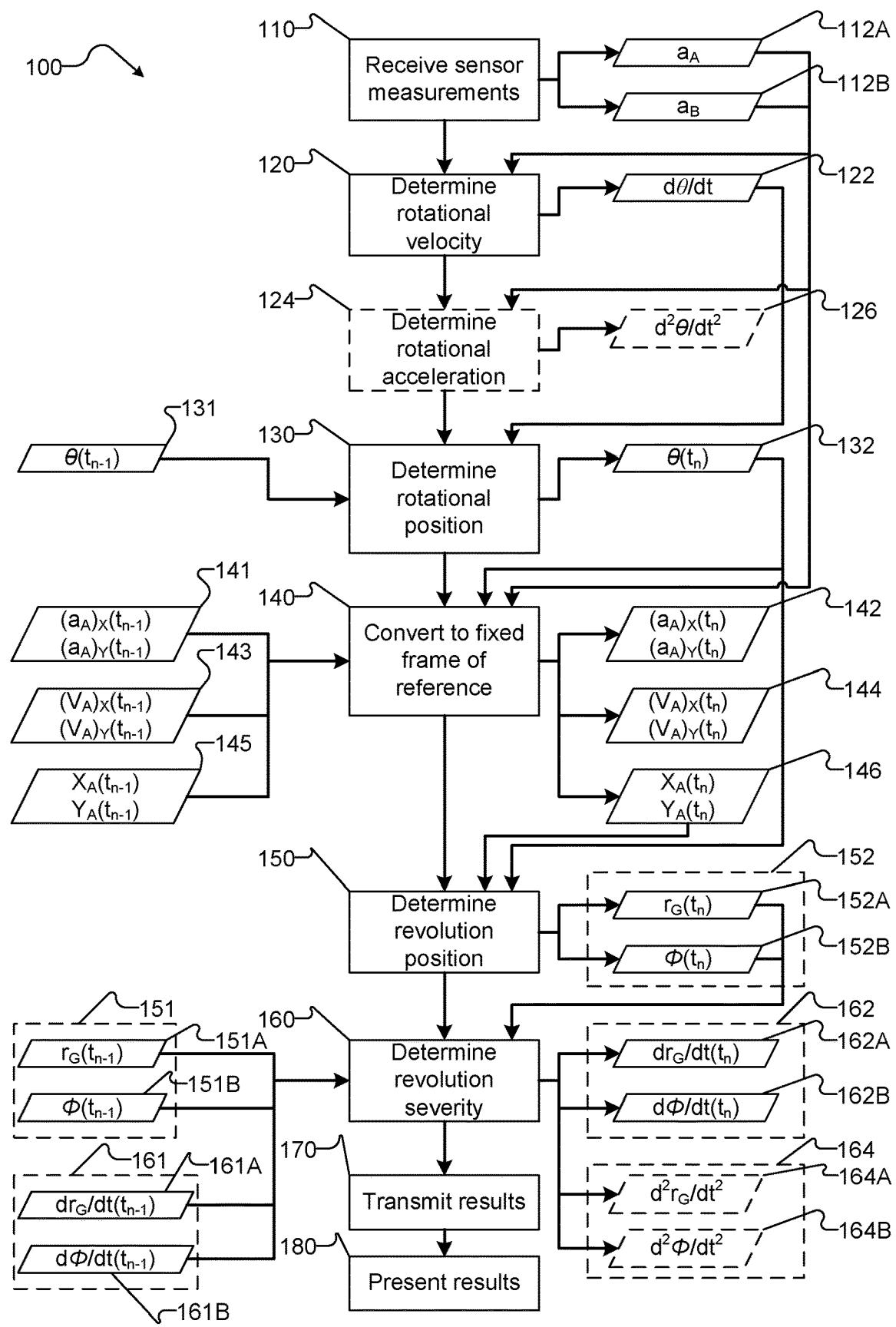
FIG. 4 is a flowchart illustrating a method that may be performed at or using a drilling system.

FIG. 4 is a flowchart illustrating an example method 100 for characterizing downhole dynamics in real time. Method 100 may be performed by processor 24, including at-surface processor 24A and/or downhole processor 24B. Block 110 involves receiving a plurality of acceleration measurements from sensors 22. Each acceleration measurement corresponds to a location in the moving reference frame. Some of the acceleration measurements are nonparallel with other acceleration measurements, thereby providing a two-dimensional (and not merely one-dimensional) representation of acceleration. Acceleration measurements may be, but are not necessarily, orthogonal to each other; non-orthogonal acceleration measurements may be decomposed into orthogonal components for convenience and/or where required. The acceleration measurements correspond to a plurality of locations in the moving reference frame, thereby permitting acceleration experienced at different points of drill string 12 to be compared to enable processor 24 to derive rotational (as well as translational and/or other) kinematic information.

In some embodiments having two bidirectional sensors 22A and 22B (such as the example embodiments depicted in FIGS. 2 and 3), the acceleration measurements may comprise a first acceleration measurement 112A received from the first sensor 22A and a second acceleration measurement 112B received from second sensor 22B (collectively and individually sensor measurements 112).

Signal processing and/or signal conditioning may be performed on sensor measurements 112 to reduce or eliminate measurement noise and/or remove any unwanted parts of the signals. Such signal processing/conditioning may be performed in the analog domain, digital domain or both. In some embodiments sensors 22 output analog signals. These signals are passed through analog signal conditioning electronics (which may, for example comprise filters such as low-pass filters) and then digitized by an analog-to-digital converter (ADC). The digitized signals may then be further processed for example using digital low pass filters, Kalman filters, etc.

Block 120 involves determining the rotational velocity 122 of drill string 12 in the plane. Processor 24 may determine the rotational velocity 122 based on the acceleration measurements and the geometry of sensors 22 and drill string 12. Where rotational angle 58 is represented as an angle (denoted $\theta$), rotational velocity 122 may be represented as an angular velocity and denoted $$\frac{d\theta}{dt}.$$

For example, in at least the example embodiments of FIGS. 2 and 3, processor 24 may determine rotational velocity 122 based on:

$$\left(\frac{d\theta}{dt}\right)^2 = \frac{-(a_{RA} - a_{\theta B})R_A + (a_{\theta A} - a_{RB})R_B}{R_A^2 + R_B^2} \quad (2)$$

where $\alpha_{RA}$, $\alpha_{\theta A}$, $\alpha_{RB}$, $\alpha_{\theta B}$, $R_A$, $R_B$, and $$\frac{d\theta}{dt}$$

have the meanings provided above.

Any suitable convention may be adopted when determining the sign (i.e. positivity vs. negativity) of acceleration measurements and the values derived therefrom. In some embodiments, radial acceleration measurements (e.g. $\alpha_{RA}$ and $\alpha_{RB}$) which are radially outward from rotational axis 54 and tangential acceleration measurements (e.g. $\alpha_{\theta A}$ and $\alpha_{\theta B}$) which are in the counterclockwise direction are considered positive. Acceleration measurements opposing those directions are considered negative. Radial distances (e.g. $R_A$, $R_B$) may be represented as unsigned (or positive) scalar quantities.

Block 124 is optional and involves determining the rotational acceleration 126 of drill string 12 in the plane. Processor 24 may determine the rotational acceleration 126 based on the rotational velocity 122 determined at block 120 and/or based on the acceleration measurements and the predetermined geometry of sensors 22 and drill string 12. Where rotational angle 58 is represented as an angle (denoted $\theta$), rotational acceleration 126 may be represented as an angular acceleration and denoted $$\frac{d^2\theta}{dt^2}.$$

For example, in at least the example embodiments of FIGS. 2 and 3, processor 24 may determine rotational acceleration 126 based on:

$$\frac{d^2\theta}{dt^2} = \frac{(a_{RA} - a_{\theta B})R_B + (a_{\theta A} - a_{RB})R_A}{R_A^2 + R_B^2} \quad (3)$$

where $\alpha_{RA}$, $\alpha_{\theta A}$, $\alpha_{RB}$, $\alpha_{\theta B}$, $R_A$, $R_B$, and $$\frac{d^2\theta}{dt^2}$$

have the meanings provided above.

Block 130 involves determining the rotational position 132 of drill string 12 in the plane. As discussed above, rotational position 132 may be represented in any of many suitable ways. In some embodiments, rotational position 132 is represented as rotational angle 58 and may be denoted θ. Since drill string 12 may be rotating, rotational position 132 (and thus rotational angle 58) may change over time. Processor 24 may determine a rotational position 132 at a current time $t_n$ based on an incremental change in rotational position 132 and a prior rotational position 131 corresponding to a prior time $t_{n-1}$. For example, acceleration measurements 112 may correspond to a measurement time range (e.g. a 5 ms period during which acceleration measurements 112 were sensed by sensors 22). In some embodiments, processor 24 determines an incremental change in rotational position 132 over the measurement time range from $t_{n-1}$ to $t_n$ based on rotational velocity 122 and adds this incremental change to the prior rotational position 131 corresponding to $t_{n-1}$.

The rotational angle 58 at a particular moment in time t may be denoted θ(t), so the current rotational angle 58 corresponding to current time $t_n$ may be denoted $\theta(t_n)$ and the prior rotational angle 58 corresponding to prior time $t_{n-1}$ may be denoted $\theta(t_{n-1})$. Processor 24 may determine the current rotational angle 58 based on:

$$\theta(t_n) = \frac{1}{2}\left[\frac{d\theta}{dt}(t_n) + \frac{d\theta}{dt}(t_{n-1})\right](t_n - t_{n-1}) + \theta(t_{n-1}) \quad (4)$$

where $$\frac{d\theta}{dt}(t_n)$$

is the rotational velocity 122 determined based on acceleration measurements 112 corresponding to time $t_n$ (e.g. measurements sensed during the time range from $t_{n-1}$ to $t_n$) and $$\frac{d\theta}{dt}(t_{n-1})$$

is the rotational velocity 122 determined based on acceleration measurements 112 corresponding to time $t_{n-1}$ (measurements sensed during the time range from a prior time $t_{n-2}$ to $t_{n-1}$).

Those skilled in the art will appreciate that the incremental change in rotational position 132 may be determined based on the expression:

$$\frac{1}{2}\left[\frac{d\theta}{dt}(t_n) + \frac{d\theta}{dt}(t_{n-1})\right](t_n - t_{n-1}) \quad (5)$$

as described above, and/or by any suitable expression, inference, and/or analysis. For example, the incremental change may be determined based on numerical analysis (e.g. via interpolation methods). In some embodiments, additional sensor measurements may be considered to increase the accuracy of the incremental change term. For example, sensor measurements from magnetometers, encoders, and/or accelerometers may be used by processor 24 when determining the incremental change term. For instance, a second set of sensors 22 may be mounted to drill collar 18 at additional locations, and acceleration measurements 112 of such additional sensors 22 may be used to generate an average and/or weighted incremental change term. In some embodiments, however, no additional sensors 22 and/or additional sensor measurements are required, and acceleration measurements 112 are sufficient for processor 24 to determine the incremental change term (and thus rotational position 132) with reasonable accuracy.

In some embodiments, one or more parameters of the motion of drill string 12 are determined using outputs of other sensors in combination with or instead of sensors 22. For example, the discussion above explains one way to determine angular velocity $$\frac{d\theta}{dt}$$

from outputs of sensors 22A and 22B. Angular velocity may also be measured using other sensor types such as magnetometers (which detect cyclic changes in cross-axial components of the earth's magnetic field as the drill string rotates), inclinometers (which, where the drill string is inclined, detect cyclic changes in cross-axial components of the earth's gravity field as the drill string rotates), and other directional sensors which detect spatially-varying properties of formations surrounding the borehole. Outputs of such sensors may vary cyclically as the drill string rotates. Outputs from such sensors may be used to check an angular velocity derived from outputs of sensors 22 and/or to refine an angular velocity derived from outputs of sensors 22 and/or to use in other calculations in place of an angular velocity derived from outputs of sensors 22.

It is also beneficial to include a magnetometer in the apparatus so that the apparatus may be used to provide real-time toolface information. Where the apparatus includes a magnetometer or other sensors in addition to sensors 22 it is generally preferable that sensors 22 and any other sensors be coplanar in a transverse plane of the drill string. Such a coplanar arrangement minimizes errors that could arise from measurements being made at different axial positions along the drill string.

Outputs from one or more magnetometers may be applied to calculate the orientation of the string with respect to the borehole highside and/or its rotational velocity, and to discriminate between the gravity field (desired component of certain measurements) and other components (e.g. centripetal fields). Having real-time toolface information (e.g. from Equation (4), and rotational velocity e.g. from magnetometers and/or from Equation (2)), total gravity field (e.g. from a previous survey or total field charts, or an embedded three-axis accelerometer), and measurement of acceleration in an axial direction (e.g. from an axial accelerometer which is insensitive to rotational effects while drilling), the cross-axial components of the earth's gravity field may be calculated from:

$$g_l = g_t \sin(\text{Inc}) \quad (6)$$

$$\text{Inc} = \cos^{-1}(g_z/g_t) \quad (7)$$

$$g_x = -g_l \cos\theta = -g_t \sin(\text{Inc})\cos\theta \quad (8)$$

$$g_y = g_t \sin(\text{Inc})\sin\theta \quad (9)$$

where $g_t$ is the total gravity field, $g_x$, $g_y$ and $g_z$ are respectively the magnitudes of the components of gravity along the x, y and z axes of the rotating frame of reference (with z being along the axis of drill string), $g_l$ is the magnitude of the total lateral component of g that is perpendicular to the axis of drill string, and Inc is the inclination angle (with Inc=0 for the case where the portion of the drill string being considered is vertical). By knowing the three components of the gravity field (i.e. $g_x$, $g_y$, $g_z$) and the three components of the magnetic field ($m_x$, $m_y$, $m_z$ from magnetometers that are insensitive to rotation), the direction of the wellbore, commonly known as azimuth, can be calculated (e.g. from equations known to those skilled in the art).

Block 140 involves converting a pre-conversion location of downhole system 40 in the moving reference frame (which is defined relative to the position of drill string 12 and/or sensors 22) to a converted location 146 in the static reference frame based on acceleration measurements 112. The pre-conversion and converted locations correspond to the same physical point in the plane, but are represented in different reference frames. In some embodiments, one of the sensor 22 locations (e.g. the location of first sensor 22A) is selected as the pre-conversion location, for convenience. However, any suitable location may be used as the pre-conversion location. For example, the location of rotational axis 54 in the plane may be used as the pre-conversion location.

In some embodiments, processor 24 performs the conversion of block 140 by converting acceleration measurements 112 (represented in the moving reference frame) corresponding to the pre-conversion location into converted acceleration measurements 142 (represented in the static reference frame) based on rotational position 132. Processor 24 may determine converted location 146 based on the predetermined geometry of drilling system 40 and converted acceleration measurements 142. In some embodiments, processor 24 determines a converted velocity 144 (represented in the static reference frame) corresponding to the pre-conversion location based on converted acceleration measurements 142, and may determine converted locations 146 based on converted velocities 144.

The determination of converted acceleration measurements 142 and/or converted velocities 144 may be implicit or explicit. For example, processor 24 may proceed directly to determining converted location 146 based on acceleration measurements 112 by performing arithmetic operations which are mathematically equivalent to determining converted acceleration measurements 142 and/or converted velocities 144 without necessarily identifying the result of any particular calculation as converted acceleration measurements 142 and/or converted velocities 144.

In at least some embodiments where the static reference frame is defined by axes 44, 46 and a first sensor 22A senses bidirectional acceleration measurements $a_A$ at a corresponding location A (e.g. as shown in FIG. 3), processor 24 determines converted acceleration measurements 142 by determining the projection of $\alpha_A$ onto first axis 44 (denoted $(\alpha_A)_X$) and onto second axis 46 (denoted $(\alpha_A)_Y$). Converted acceleration measurements 142 may then comprise projections $(\alpha_A)_X$ and $(\alpha_A)_Y$ (and/or a suitable combination thereof). In at least some embodiments where rotational position 132 comprises a rotational angle 58, projections $(\alpha_A)_X$ and $(\alpha_A)_Y$ are based on:

$$(\alpha_A)_X = \alpha_{RA} \cos\theta - \alpha_{\theta A} \sin\theta, \quad (10)$$

$$(\alpha_A)_Y = \alpha_{RA} \sin\theta + \alpha_{\theta A} \cos\theta. \quad (11)$$

Converted velocity 144 may be determined based on converted acceleration measurements 142 in any suitable way. For example, processor 24 may determine an incremental change in velocity in the time window between prior time $t_{n-1}$ and current time $t_n$ and may add that incremental change to a prior converted velocity 143 to determine converted velocity 144 corresponding to current time $t_n$. The incremental change in velocity may be based on prior converted acceleration 141 corresponding to prior time $t_{n-1}$ and current converted acceleration 142 corresponding to current time $t_n$.

In at least some embodiments where the static reference frame is defined by axes 44, 46 and processor 24 has determined projections $(\alpha_A)_X$ and $(\alpha_A)_Y$, processor 24 may determine a converted velocity 144 by first determining components $(V_A)_X(t_n)$ and $(V_A)_Y(t_n)$, where $(V_A)_X(t_n)$ is the projection of converted velocity 144 onto first axis 44 at current time $t_n$ and $(V_A)_Y(t_n)$ is the projection of converted velocity 144 onto second axis 46 at current time $t_n$. Converted velocity 144 may then comprise projections $(V_A)_X(t_n)$ and $(V_A)_Y(t_n)$ (and/or a suitable combination thereof). In some embodiments, processor 24 may determine projections $(V_A)_X(t_n)$ and $(V_A)_Y(t_n)$ based on:

$$(V_A)_X(t_n) = \frac{(a_A)_X(t_n) + (a_A)_X(t_{n-1})}{2}(t_n - t_{n-1}) + (V_A)_X(t_{n-1}), \quad (12)$$

$$(V_A)_Y(t_n) = \frac{(a_A)_Y(t_n) + (a_A)_Y(t_{n-1})}{2}(t_n - t_{n-1}) + (V_A)_Y(t_{n-1}) \quad (13)$$

where $(V_A)_X(t_{n-1})$ is the projection of converted velocity 144 onto first axis 44 at prior time $t_{n-1}$, $(V_A)_Y(t_{n-1})$ is the projection of converted velocity 144 onto second axis 46 at prior time $t_{n-1}$, $(\alpha_A)_X(t_n)$ is the value of projection $(a_A)_X$ at current time $t_n$, $(\alpha_A)_Y(t_n)$ is the value of projection $(\alpha_A)_Y$ at current time $t_n$, $(\alpha_A)_X(t_{n-1})$ is the value of projection $(\alpha_A)_X$ at prior time $t_{n-1}$, and $(\alpha_A)_Y(t_{n-1})$ is the value of projection $(\alpha_A)_Y$ at prior time $t_{n-1}$.

Converted location 146 may be determined based on converted acceleration measurements 142 in any suitable way. For example, processor 24 may determine converted location 126 based on converted velocity 144 and prior converted velocity 143. For example, processor 24 may determine an incremental change in location in the time window between prior time $t_{n-1}$ and current time $t_n$ and may add that incremental change to a prior converted location 145 to determine converted location 146 corresponding to current time $t_n$.

In at least some embodiments where the static reference frame is defined by axes 44, 46 and processor 24 has determined projections $(V_A)_X$ and $(V_A)_Y$, processor 24 may determine converted location 146 by first determining coordinates $X_A(t_n)$ and $Y_A(t_n)$, where $X_A(t_n)$ is the projection of converted location 146 onto first axis 44 at current time $t_n$ and $Y_A(t_n)$ is the projection of converted location 144 onto second axis 46 at current time $t_n$. Converted location 146 may then comprise coordinates $X_A(t_n)$ and $Y_A(t_n)$ (and/or a suitable combination thereof). In some embodiments, processor 24 may determine coordinates $X_A(t_n)$ and $Y_A(t_n)$ based on:

$$X_A(t_n) = \frac{(V_A)_X(t_n) + (V_A)_X(t_{n-1})}{2}(t_n - t_{n-1}) + X_A(t_{n-1}), \quad (14)$$

$$Y_A(t_n) = \frac{(V_A)_Y(t_n) + (V_A)_Y(t_{n-1})}{2}(t_n - t_{n-1}) + Y_A(t_{n-1}) \quad (15)$$

where $X_A(t_{n-1})$ is the projection of converted location 146 onto first axis 44 at prior time $t_{n-1}$ and $Y_A(t_{n-1})$ is the projection of converted location 146 onto second axis 46 at prior time $t_{n-1}$.

Block 150 involves determining the revolution position 152 of drill string 12 about revolution axis 52. Revolution position 152 may be represented in any of many suitable ways, such as with polar coordinates (as an angle and distance from an origin), in Cartesian coordinates, and/or otherwise. Processor 24 may determine the revolution position 152 based on converted location 146 (e.g. based on coordinates $X_A(t_n)$ and $Y_A(t_n)$). In some embodiments, revolution position 152 is represented as a revolution radius 152A (denoted $r_G$, and an example of which shown as revolution radius 55 in FIG. 2) and a revolution angle 152B (denoted $\phi$, and an example of which is shown as revolution angle 56 in FIG. 2). In some embodiments, processor 24 determines revolution position 152 based on:

$$r_G = \sqrt{(Y_A \sin\theta + X_A \cos\theta - R_A)^2 + (Y_A \cos\theta - X_A \sin\theta)^2}, \quad (16)$$

$$\phi = \theta - \sin^{-1}\left[\frac{Y_A \cos\theta - X_A \sin\theta}{r_G}\right]. \quad (17)$$

Block 160 involves determining the severity of whirl of drill string 12. An operator of drill string 12 may use a variety of kinematic information to understand the severity of whirl. For example, the severity may be determined by processor 24 based on revolution radius 152A, larger radii tend to indicate more severe whirl.

Revolution radius 152A is also indicative of the location of bit 14 in the hole. Where zero radius corresponds to the center of the hole a revolution radius 152A having a value of zero corresponds to a perfectly centered bit in the hole (i.e. optimum condition). Revolution radius 152A therefore can serve as an indicator of drilling quality. In some embodiments, revolution radius 152A is monitored and plotted as a function of depth. An operator may use such a plot to optimize drilling as well as to make operational decisions regarding things such as when to replace the drill bit.

Revolution radius 152A also can be used as an indicator of the actual size of the drilled hole. An estimate of hole size may be obtained from revolution radius 152A and the known geometry of the drill string. δ=Bit radius–collar radius indicates the clearance between the string and wellbore at the axial location of sensors 22 in the case that the collar is centered and the wellbore is the same diameter as the drill bit. The wellbore is oversized in cases where revolution radius 152A is greater than δ. In some embodiments revolution radius 152A and/or an indicator of actual hole size derived from revolution radius 152A is displayed to an operator at the surface. For instance, values of $r_G$ can be plotted versus $\phi$ to demonstrate the locus of the center of the drill string in wellbore in real-time, or values of $r_G$+collar radius can be plotted versus $\phi$ to illustrate the locus of OD of drill string in borehole. To facilitate producing such graphs, values of $r_G$ and $\phi$ (acquired at the same time, or with their individual time tags) may be transmitted to the surface. Alternatively values of maximum, average, and minimum of $r_G$ (from Eq. (16), occurring in one full revolution or any desired number of revolutions) can be transmitted to the surface to approximate the locus of the drill string.

The radial velocity of the center of the drill string can also be used as an indication of the radial movement of the drill string in the borehole, using the equation:

$$\dot{r}_G = \frac{r_{G(t_n)} - r_{G(t_{n-1})}}{t_n - t_{n-1}}$$

where higher velocities or abrupt changes in the direction of velocity indicate undesired lateral movements of the drill string in borehole that should be avoided during drilling. Depending on set values of threshold for $\dot{r}_G$ a flag can be sent to surface to indicate high or low lateral movements. Sudden changes in the direction of radial velocity (i.e. $\ddot{r}_G$) are given by:

$$\ddot{r}_G = \frac{\dot{r}_{G(t_n)} - \dot{r}_{G(t_{n-1})}}{t_n - t_{n-1}}$$

and can be used as an indicator of motion of the drill string in the same manner. Moreover, values of $\dot{r}_G$ and $\ddot{r}_G$ can be used to confirm maximum or minimum of $r_G$ in each revolution. Maximum $r_G$ will occur when $\dot{r}_G$=0 and $\ddot{r}_G$<0, and minimum $r_G$ occurs when $\dot{r}_G$=0 and $\ddot{r}_G$>0.

In some embodiments, processor 24 determines the severity of whirl based on a revolution velocity 162 and/or a revolution acceleration 164. These parameters may be used to assess the severity of whirl of drill string 12. For example, revolution velocity 162 provides a measure of the current severity of whirl, as faster revolution generally corresponds to more potentially-damaging whirl. Additionally, or alternatively, revolution velocity 162 may be compared to the rotational velocity 122 (and/or an expected rotational velocity of drill string 12) to identify the type of whirl. For example, if the direction of revolution velocity 162 opposes the direction of rotational velocity 122 (and/or an expected rotational velocity of drill string 12), then drill string 12 may be determined to be experiencing backward whirl, which is generally considered more severe than other types of whirl. In some an indicator of the severity of whirl is displayed to an operator at the surface.

As another example, if the directions of revolution velocity 162 and rotational velocity 122 (and/or an expected rotational velocity of drill string 12) match, then drill string 12 is experiencing forward whirl. If the directions match (e.g. both velocities 122 and 162 correspond to clockwise paths) and the magnitudes of revolution velocity 162 and rotational velocity 122 (and/or an expected rotational velocity of drill string 12) are approximately equal, then drill string 12 may be determined to be experiencing forward synchronous whirl.

Revolution acceleration 164 may also, or alternatively, be used to assess the severity of revolution/whirl. For example, if revolution acceleration 164 corresponds to an increasing magnitude of revolution velocity 162, then it may be determined that the severity of revolution/whirl is increasing. Thus, revolution acceleration 164 provides a prediction of near-future whirl severity, and enables an operator of drill string 12 to compensate preemptively. Further, a first drill string 12 having a greater revolution acceleration 164 than a second drill string 12 (but otherwise having identical revolution velocity 162) may be considered to have more severe revolution/whirl than the second drill string 12.

Processor 24 may determine revolution velocity 162 based on a history of revolution positions 152. For example, processor 24 may determine a revolution velocity 162 based on current revolution position 152 corresponding to current time $t_n$ and prior revolution position 151 corresponding to prior time $t_{n-1}$. In some embodiments, processor 24 determines a radial revolution velocity 162A at current time $t_n$ (denoted $$\frac{dr_G}{dt}(t_n))$$

based on current revolution radius 152A and prior revolution radius 151A and an angular revolution velocity 162B (denoted $$\frac{d\phi}{dt}(t_n))$$

based on current revolution angle 152B and prior revolution angle 151B. Revolution velocity 162 may then comprise components $$\frac{dr_G}{dt}(t_n) \text{ and } \frac{d\phi}{dt}(t_n)$$

(and/or a suitable combination thereof). In some embodiments, processor 24 determines components $$\frac{dr_G}{dt}(t_n) \text{ and } \frac{d\phi}{dt}(t_n)$$

based on:

$$\frac{dr_G}{dt}(t_n) = \frac{r_G(t_n) - r_G(t_{n-1})}{t_n - t_{n-1}}, \tag{18}$$

$$\frac{d\phi}{dt}(t_n) = \frac{\phi(t_n) - \phi(t_{n-1})}{t_n - t_{n-1}} \tag{19}$$

where $r_G(t_n)$ is the revolution radius 152A at current time $t_n$, $r_G(t_{n-1})$ is the prior revolution radius 151A at prior time $t_{n-1}$, $\phi(t_n)$ is the revolution angle 152B at current time $t_n$, and $\phi(t_{n-1})$ is the prior revolution angle 151B at prior time $t_{n-1}$.

Processor 24 may determine revolution acceleration 164 based on a history of revolution velocities 162. For example, processor 24 may determine a revolution acceleration 164 based on current revolution velocity 162 corresponding to current time $t_n$ and prior revolution velocity 161 corresponding to prior time $t_{n-1}$. In some embodiments, processor 24 determines a radial revolution acceleration 164A at current time $t_n$ (denoted $$\frac{d^2 r_G}{dt^2}(t_n))$$

based on current radial revolution velocity 162A and prior radial revolution velocity 161A and an angular revolution acceleration 164B (denoted $$\frac{d^2\phi}{dt^2}(t_n))$$

based on current angular revolution velocity 162B and prior angular revolution velocity 161B. Revolution acceleration 164 may then comprise components $$\frac{d^2 r_G}{dt^2}(t_n) \text{ and } \frac{d^2\phi}{dt^2}(t_n)$$

(and/or a suitable combination thereof). In some embodiments, processor 24 determines components $$\frac{d^2 r_G}{dt^2}(t_n) \text{ and } \frac{d^2\phi}{dt^2}(t_n)$$

based on:

$$\frac{d^2 r_G}{dt^2}(t_n) = \frac{\frac{dr_G}{dt}(t_n) - \frac{dr_G}{dt}(t_{n-1})}{t_n - t_{n-1}}, \tag{20}$$

$$\frac{d^2\phi}{dt^2}(t_n) = \frac{\frac{d\phi}{dt}(t_n) - \frac{d\phi}{dt}(t_{n-1})}{t_n - t_{n-1}} \tag{21}$$

where $$\frac{dr_G}{dt}(t_n)$$

is the radial revolutional velocity 162A at current time $t_n$, $$\frac{dr_G}{dt}(t_{n-1})$$

is the prior radial revolution velocity 161A at prior time $t_{n-1}$, $$\frac{d\phi}{dt}(t_n)$$

is the angular revolution velocity 162B at current time $t_n$, and $$\frac{d\phi}{dt}(t_{n-1})$$

is the prior angular revolution velocity 161B at prior time $t_{n-1}$.

As drill string 12 revolves in wellbore 42, drill string 12 may impact (i.e. collide with) a surface of wellbore 42. In some embodiments, accelerations sensed by sensors 22 and/or quantities derived therefrom are used to detect impacts of drill string 12 with a surrounding surface of wellbore 42 (such as casing 16 and/or surrounding formation). For example, a sudden change in revolution acceleration 164 (e.g. a change in $$\frac{d^2 r_G}{dt^2} \text{ and/or } \frac{d^2 \phi}{dt^2}\Bigg)$$

may be determined to correspond to an impact against a surface of wellbore 42. In some embodiments, processor 24 may characterize impacts by determining a rate of change of revolution acceleration 164 (e.g. by determining $$\frac{d^3 r_G}{dt^3} \text{ and/or } \frac{d^3 \phi}{dt^3}\Bigg)$$

and by identifying local maxima in the rate of change which exceed a threshold. Such maxima may be interpreted as sudden shocks which correspond to impacts. In some embodiments, processor 24 may determine a circumferential shape of the surface of wellbore 42 based on the location of drill string 12 (e.g. $r_G$ and/or $\phi$) at the moment that an impact is determined to have occurred.

Block 170 involves transmitting results from downhole processor 24B to at-surface processor 24A. In some embodiments, block 170 involves transmitting at least the determined values for rotational position 132, rotational velocity 122, rotational acceleration 126, revolution position 152, revolution velocity 162, and revolution acceleration 164 (e.g. $\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \text{ and } \frac{d^2\phi}{dt^2}\Bigg)$$

corresponding to current time $t_n$. In some embodiments, acceleration measurements (e.g. one or more of accelerations measurements 112A, 112B, and 142) may also, or alternatively, be transmitted. In some embodiments, some values may be omitted. For example, rotational acceleration 126 and/or revolution acceleration 164 may be omitted.

In some embodiments, partial results are transmitted from downhole processor 24B to at-surface processor 24A. For example, downhole processor 24B may transmit acceleration measurements 112 to at-surface processor 24A, and at-surface processor 24A may perform the remaining steps of method 100. As discussed above, in such circumstances method 100 is still considered to be performed "by processor 24" (or, in the claims, "by the processor"), as processors 24A, 24B are collectively considered a processor 24.

Block 180 involves presenting some or all of the results determined by processor 24 to a user (e.g. an operator of drill rig 10). For example, processor 24 may render the results into a graphical representation of one or more aspects of the downhole dynamics of downhole system 40. For example, results relating to whirl of drill string 12 (e.g. revolution position 152 and/or revolution velocity 162) may be used to display a graphical representation of drill string 12 revolving, with a speed and path corresponding to that of drill string 12, within a graphical representation of wellbore 42. Alternatively, or in addition, results may be presented to a user textually (e.g. by displaying numerical values of one or more results) and/or symbolically (e.g. with an ascending arrow if revolution acceleration 164 corresponds to increasing revolution velocity 162).

In some embodiments, block 180 involves displaying representations of some or all of the determined results to a user. FIGS. 5A, 5B, and 5C (collectively and individually "FIG. 5") show example displays 200A, 200B, and 200C, respectively (collectively and individually "displays 200") which display representations of example results. FIG. 5 shows example displays 200 displaying results corresponding to a drill string 12 undergoing forward whirl. Displays 200 may be graphical (as in FIGS. 5A and 5B), textual, and/or otherwise represented. Different types of displays 200 may be combined into a single display; for example, displays 200B and 200C may be provided together (e.g. side-by-side, as alternatives which may be toggled between by a user, and/or otherwise provided). In some embodiments, displays 200 may be at-surface and adjacent to a drill rig 10 as illustrated in FIG. 1.

Each graphical display 200A, 200B graphically displays a drill string representation 212 inside a wellbore representation 242. Displays 200A, 200B may additionally, or alternatively, comprise center representation 208 of drill string representation 212 and/or center representation 210 of wellbore representation 242. In some embodiments, displays 200A, 200B comprise a path representation 202 corresponding to a path of drill string 212 in wellbore 42. Path representation 202 may be displayed through the use of graphical indicia (e.g. dotted lines, such as those shown in FIG. 5A), animation (e.g. of drill string representation 212), and/or other graphical representations.

In some embodiments, graphical displays 200A, 200B may comprise directional representations 204 and/or 206. Directional representation 204 corresponds to the direction of movement of drill string representation 212 along path representation 202, and may thus correspond to the direction of revolution of drill string 12 in wellbore 42. Direction representation 206 corresponds to the direction of rotation of drill string 12 in wellbore 42. Directional representations 204, 206 may be displayed through the use of graphical indicia (e.g. directional arrows, such as those shown in FIG. 5A), animation (e.g. of drill string representation 212), and/or other graphical representations.

FIGS. 5A and 5B depict different scenarios. In the scenario of FIG. 5A, drill string 12 is periodically impacting a surface of wellbore 42 over the course of a revolution. In some embodiments, points of impact are represented graphically by impact representations 214. In some embodiments, impact representations 214 are displayed selectively based on the force of impact; it may be expected that drill string 12 abut a surface of wellbore 42 at various times, and so a user may only desire notification of impacts when such impacts are sufficiently forceful. In the scenario of FIG. 5B, drill string 12 is in a substantially regular revolutionary orbit, and no impact representations 214 are displayed.

FIG. 5C provides an example textual display 200C which textually displays results and/or summaries of results determined by processor 24. Display 200C provides a directional representation 222 corresponding to forward whirl (indicating that the rotation and revolution of drill string 12 are in the same direction), a revolution speed representation 224 (e.g. based on $$\frac{d\phi}{dt}$$

of revolution velocity 162), and a rotational speed representation 226 (e.g. based on $$\frac{d\theta}{dt}$$

of rotational velocity 122). Revolution and/or rotational speed representations 224, 226 may be expressed in any suitable way, e.g. in terms of rotations/revolutions per minute, meters per second, miles per hour, and/or the like.

In some embodiments, block 180 of the FIG. 4 method 100 additionally or alternatively displays results to a user through use of a warning indication, e.g. via a light-emitting element, an audio element, etc. For example, processor 24 may provide a warning indication to a user by controlling a warning light to turn on and/or to flash, by controlling a speaker to emit a warning sound (such as an alarm), and/or by other means. In some embodiments, processor 24 provides a warning indication in response to detecting that one or more of the determined results correspond to a potentially dangerous downhole dynamics. For instance, a determination that drill string 12 is engaged in backwards whirl, that a magnitude of revolution velocity 162 exceeds a threshold, that drill string 12 is impacting a surface of wellbore 42 with force exceeding a threshold, and/or that any other potentially harmful event has occurred or is occurring may cause processor 24 to provide a warning indication.

Kinematics data (e. g. θ, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2})$$

can also be used to estimate the kinetics of the bit/string. For example accelerations can be used to estimate forces applied to the bit and/or to estimate the amount of friction, torque and drag between the formation and bit/string. These values can optionally be used in an automatic control system to optimize drilling.

For example, $E_0 = T_o/T_{surface}$ is an indication of drilling efficiency where $T_o$ is the output torque (i.e. desired portion of torque applied to drill bit 14 to cut through formation) and $T_{surface}$ is the torque applied to drive the drill string at the surface. One can treat the Bottom-Hole-Assembly (BHA) as a rigid body. The angular acceleration of the BHA is related to the net torque on the BHA by:

$$J_{BHA}\ddot{\theta} = \Sigma T = T_i - T_o - T_f - T_c \quad (22)$$

where $J_{BHA}$ is the polar moment of inertia at the BHA, $T_i$ is the torque at the bottom of the drill string driving the BHA, $T_f$ is the torque resulting from friction between the BHA and drilling fluid, and $T_c$ is the torque resulting from friction between the BHA and the borehole wall (in cases where the BHA is in contact with the borehole wall).

The input torque $T_i$ is given by:

$$T_i = K_S \psi = \frac{J_S G_S}{l_S}(\omega_S t - \phi) \quad (23)$$

where $K_s$ is the torsional stiffness of the drill string, $\psi$ is the amount of twist in the drill string, $J_s$ is the polar moment of inertia of the drill string, $G_s$ is the shear modulus of the drill string, $I_s$ is the length of the drill string from the surface to the top of the BHA, $\omega_s$ is the rate of rotation of the drill string at the surface, and t is time (which is synchronized between the surface and downhole clocks).

An estimate of the torque $T_f$ is given by (Fritz, *ASME J. Basic Eng.* 1970; Muszynska *J Sound Vib.* 1986):

$$T_f = F_{f\theta} r_G = \left[ m_f \left( r_G \ddot{\theta} + 2\dot{r}_G \dot{\theta} - r_G \dot{\phi} \right) + \left( \dot{\theta} - \frac{\dot{\phi}}{2} \right)(\mu_f + C r_G^2) r_G \right] r_G \quad (24)$$

where $F_{f\theta}$ is the frictional force of the drilling fluid acting on the BHA in the θ direction, $m_f$ is the effective mass of the drilling fluid, $\mu_f$ is the coefficient of friction of the drilling fluid, and C is a constant.

An estimate of the torque Tc is given by (Leine et al., *J. Vibration and Acoustics* 2002):

$$T_c = F_{fc} R_{WB} = \mu_{BH} \text{Sign}(r_G \dot{\phi} + R_{BHA} \dot{\theta})(K_B(r_G - R_{BHA})) R_{WB} \quad (25)$$

where $F_{fc}$ is the force of friction between the BHA and the wellbore wall, $R_{WB}$ is the radius of the wellbore, $\mu_{BH}$ is the coefficient of friction between the BHA and the wall of the wellbore, $K_B$ is a constant that models the force applied to the BHA by the wall of the wellbore. This example assumes that after the BHA contacts the wall of the wellbore the force exerted by the wall of the wellbore on the BHA increases linearly with further displacement of the BHA against the wall. Other models of how the force on the BHA resulting from contact with the wall of the wellbore may be used.

Kinematics and kinetics data also can be used to improve the transfer of loads to the drill bit and/or improve the steerability of the BHA. For instance, one can use outputs of the sensors to calculate (φ) at the location of the sensor packages (e.g. in BHA, or any other section of the drill string). To facilitate calculations this is preferably while the drill string is being rotated at a constant RPM. The parameter (φ) can be used to find the magnitude of frictional torque (i.e. resultant of all resistive torques applied to the string from surface to the location of the sensor package) as follows:

$$T_{imp} = T_{surface} - \frac{J_s G_s (\omega_s t - \phi)}{l_s}$$

where $T_{imp}$ is the amount of torque that is required to impend the rotational motion of the drill string. Therefore, while sliding, one can apply a value of torque equal or smaller than $T_{imp}$ to the drill string on surface to overcome the friction that may exist between the string and borehole and mud to improve the steerability of the BHA. Since values of $T_{surface}$, $\omega_s$, time (which is synchronized with the clock of the downhole tool), and structural and geometrical information of the string are known at surface, it is usually most convenient to transmit parameter $\phi$ to surface to calculate $T_{imp}$. Alternatively, surface values can be downlinked to the downhole system to perform computations downhole.

The value of $T_{imp}$ can also be used to estimate the resultant drag force applied to the section of the drill string from surface to the location of the sensor package. For example, if we assume that substantially all of the torque required to impede the rotational motion of the string (i.e. $T_{imp}$) results from friction between the borehole and the drill string (which is a valid assumption in most cases), then the amount of resultant drag can be estimated as:

$$\text{Drag} = \frac{T_{imp}}{R}$$

where R is the radius of the drill string in the location that the sensor package is installed. The resultant drag force can be used as an estimation of the amount of axial force that is required to overcome axial friction and can be used to estimate the magnitude of weight on bit (WOB) or to adjust the hook load to provide the desired WOB. A simple estimate can be:

WOB=Hook Load-$W$-Drag where W is the weight of the drill string. Using methods similar to those described for $T_{imp}$, values of WOB can be calculated at the surface. In other embodiments, such values are calculated downhole.

The estimates for $T_{imp}$, Drag and WOB are particularly useful in cases where the well profile deviates from the vertical direction (i.e. deviated and horizontal wells) since the commonly used torque and drag equations usually ignore the effect of local doglegs and tortuosities that occur in different sections of the wellbore. The equations presented here have the advantage of using kinematics to obtain kinetics, meaning that local effects (which are hard to predict and model) are inherently included in computations.

In addition to or as an alternative to providing parameters obtained as described herein for the information of an operator of a drilling operation such parameters may be used in an automatic drilling control system. A control system may be a closed loop control system or alternatively an open loop system. Methods and apparatus as described herein can provide for non-linear adaptive control by an automated control system which monitors drilling parameters and/or measurements and controls the drilling system to prevent undesirable events such as stick/slip, BHA sag or whirl.

Figure 6:
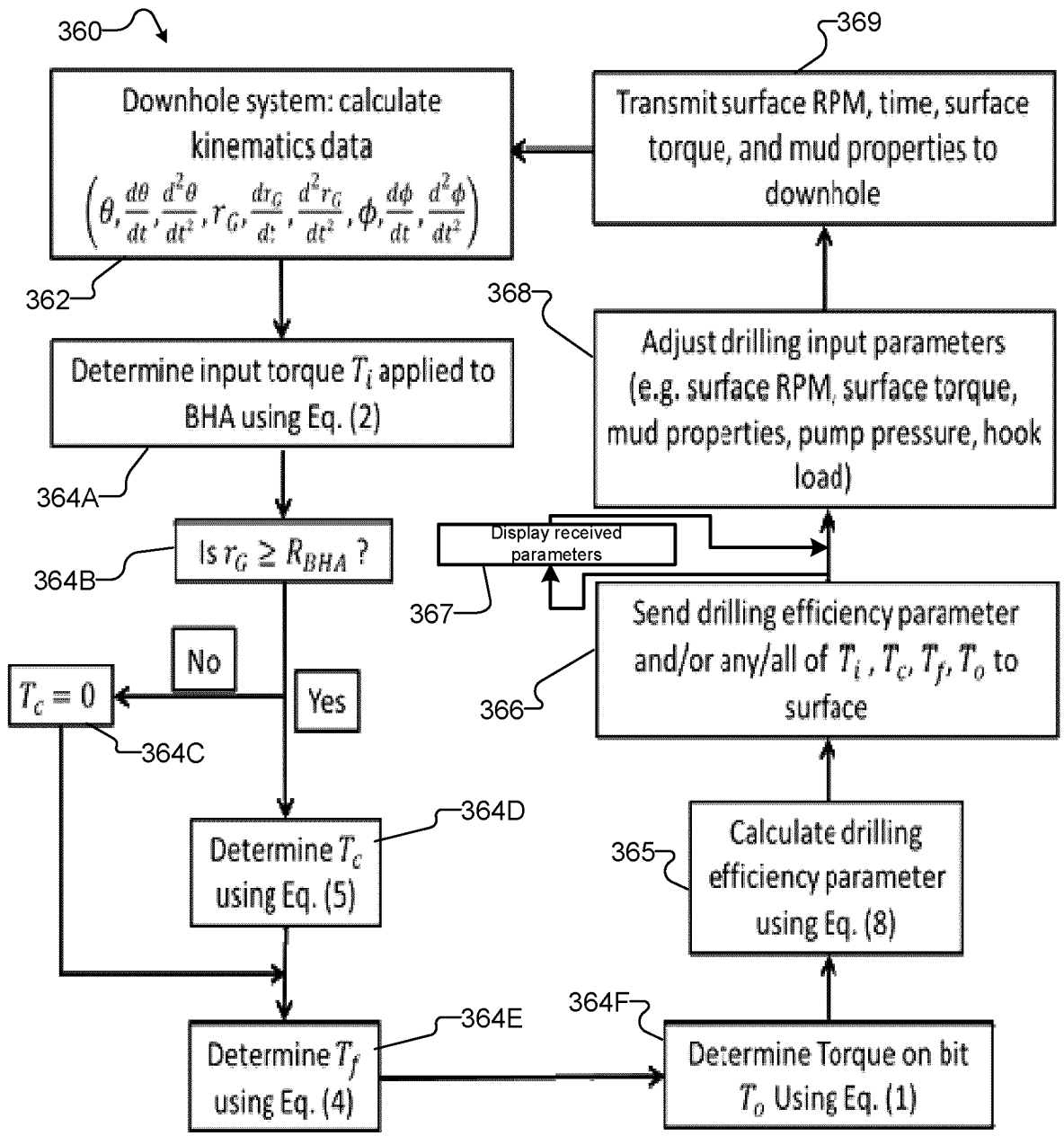
FIG. 6 illustrates an example control method in which drilling parameters and/or their transmission frequencies can be adjusted according to one embodiment.

FIG. 6 illustrates an example control method 360. In block 362, accelerometer measurements and/or other sensor readings (e.g. $a_{RA}$, $a_{\theta A}$, $a_{RB}$, $a_{\theta B}$) are acquired at a downhole system. These readings are utilized to calculate some or all of the parameters ($\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2}).$$

These parameters are used in blocks 364A through 364F to calculate torque on bit ($T_o$). In block 365 a drilling efficiency parameter is calculated.

In block 366 the drilling efficiency parameter, torque on bit and/or other parameters are transmitted to the surface using a telemetry system. In block 367, the received parameters are optionally displayed to a drill rig operator using, for example, displays 200. In block 368 the received parameters are applied to tune drilling parameters (e.g. RPM, WOB or weight on bit, mud flow, etc.). In block 369, drilling parameters are transmitted to the downhole system. The drilling parameters may be applied at the downhole system to calculate the drilling efficiency parameter, for example.

The frequency with which parameters are transmitted to the surface may be pre-set or controlled in an open-loop or closed loop manner. FIG. 6 illustrates one way in which the type of parameters to be calculated and/or their transmission frequencies can be adjusted in a closed loop system. Advantageously the rate at which parameters are calculated and transmitted to the surface is adjusted to be slightly more than a minimum rate required to maintain control of the drilling operation at the current drilling parameters. Keeping the rate at which parameters are calculated and transmitted helps to optimize power consumption, and rate of transmission of data from downhole to surface. In an open loop system, pre-set configurations are used to calculate parameters.

Different parameters may be transmitted to the surface during different phases of a drilling operation. For instance, while a curved trajectory is being built (often called 'sliding'), the sensor system (which can be placed as close as possible to the drill bit) may be configured to calculate and transmit parameter $\theta$. $\theta$ is a measure of orientation of a drill bit with respect to a fixed coordinate system and its real-time value can be used for building a curved trajectory. To adjust drilling parameters and orient the drill bit in the desired direction, the directional driller or MWD hand can request parameter $\theta$ at desired intervals. After the desired curve is built, the driller may switch from parameter $\theta$ to rotary speed $$\frac{d\theta}{dt}$$

to monitor and optimize the rate of rotation of the string and minimize unwanted dynamic effects such as stick/slip.

The operations described in block 368 (i.e. adjusting drilling parameters) can be done in an automatic and/or iterative fashion based on pre-defined settings (e.g. defined by a drill rig operator). Alternatively, or in addition, drilling parameters may be adjusted (i.e. block 368) manually by a drill rig operator based on the received parameters. For instance, one may desire to minimize or eliminate whirl while drilling. In such embodiments, an objective of the iterative algorithm implemented at block 368 is to minimize $r_G$ or make it zero. Minimization of $r_G$ may be achieved by increasing WOB or weight on bit incrementally and monitoring changes in $r_G$. If $r_G$ is decreased, the incremental increase in weight on bit (i.e. increasing friction and dampening) may be continued until a desired minimum level of $r_G$ is achieved. However, if $r_G$ is increased by incremental increase in weight on bit, the system will automatically reverse the procedure to incrementally decrease the weight on bit (i.e. to decrease deflection due to axial compression) to achieve the desired result. More than one parameter may need to be adjusted to accomplish this objective. For instance, the incremental method may first reduce surface RPM to a certain level and subsequently adjust weight on bit incrementally (or vice versa).

As another example, it is often desired to maintain a relatively constant downhole RPM (i.e. minimum torsional oscillations or stick/slip). In such embodiments, an objective of the steps at block 368 is to control drilling such that the value $\ddot{\theta}$ (as described by Eq. (3)) is made to tend toward zero by incrementally adjusting the weight on bit and/or surface RPM. This can be achieved by incrementally decreasing weight on bit (to decrease friction) and/or increasing surface RPM, and monitoring resulting changes in $\ddot{\theta}$.

The steps performed at block 368 may optionally comprise temporarily ceasing drilling and lifting the bit off bottom to mitigate stick/slip. In some embodiments this is done automatically.

Figure 8:
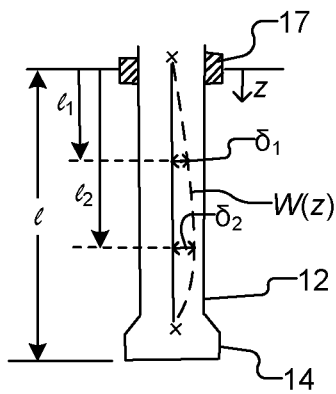
FIG. 8 illustrates an example deflection curve for a drill string wherein at least one sensor package is installed close to the drill bit.

The kinematic information from one or more sensor packages may be used to calculate bending moment applied on the drill bit, or determine the distribution of bending moment along BHA or any section of the drill string in which the sensor packages are installed. For instance, the parameter $r_G$, as described by Eq. (16), can be used to approximate the bending moment at bit, if at least one sensor package is installed close to the drill bit as illustrated in FIG. 8.

The bending moment M at the bit, or distribution of the bending moment M along the BHA or along the drill collar or drill string can be determined from $r_G$ obtained from the sensor system. To find M, one or more sensor packages are used, depending on the shape assumed for the deflection W of the BHA or drill string (see e.g. FIG. 8). The sensors are located at a distance $l_1$ and $l_2$ from a surface. As shown in FIG. 8, the distance between $l_1$ and the deflection curve W(z) is $\delta_1$, and the distance between $l_2$ and the deflection curve W(z) is $\delta_2$, where $\delta_1$ and $\delta_2$ are $r_{G1}$ and $r_{G2}$ from Eq. (16). Two scenarios can be considered: (1) pure bending (or quadratic shape for deflection); and (2) linearly varying bending (or cubic form deflection).

For scenario (1), it is assumed that $W(z)=az^2+bz+c$, where a, b, and c are constants to be determined. The bending moment in this scenario is given by:

$$M = EI\frac{d^2w}{dz^2} = 2a \quad (26)$$

where E is the modulus of elasticity and I is the area moment of inertia.

Thus, to find W(z):

$z=0, W(0)=0$ $z=l_1, W(l_1)=r_{G_1}$ $z=l_2, W(l)=0$

Applying the above to Eq. (26), we obtain:

$c = 0,$ $a = \dfrac{-4r_{G_1}}{l^2}$ $b = \dfrac{-4r_{G_1}}{l}$

From Eq. (26), we can determine an approximation of the bending moment M at the bit as follows:

$$M = EI\frac{-8r_{G_1}}{l^2} \quad (27)$$

A more accurate approximation of bending moment and its distribution along the length of BHA (or any section of drill string) can be determined if more than one sensor package is used. For instance, if two sensor packages are installed between the drill bit and the first stabilizer, the distribution of bending moment along the BHA can be approximated in the following manner. If we assume a cubic form for deflection in scenario (2) then $W(z)=az^3+bz^2+cz+d$, where a, b, c and d are constants to be determined. The bending moment M in this scenario is given by:

$$M(z) = EI\frac{d^2w}{dz^2} = (6az + 2b)EI \quad (28)$$

Solving this for $W(0)=0$, $W(l_1)=r_{G_1}$, $W(l_2)=r_{G_2}$ and $W(l)=0$, we obtain:

$$d = 0, \begin{bmatrix} l^3 & l^2 & l \\ l_1^3 & l_1^2 & l_1 \\ l_2^3 & l_2^2 & l_2 \end{bmatrix} \begin{bmatrix} a \\ b \\ c \end{bmatrix} = \begin{bmatrix} 0 \\ r_{G_1} \\ r_{G_2} \end{bmatrix}$$

where:

$$a = \frac{-r_{G_1}}{(l-l_1)(l_1)(l_1-l_2)} + \frac{r_{G_2}}{(l-l_2)(l_1-l_2)(l_2)} \quad (29)$$

$$b = \frac{(l+l_2)r_{G_1}}{(l-l_1)(l_1)(l_1-l_2)} + \frac{(l+l_1)r_{G_2}}{(l-l_2)(l_2)(l_2-l_1)}$$

$$c = \frac{-(l)(l_2)r_{G_1}}{(l-l_1)(l_1)(l_1-l_2)} + \frac{(l)(l_1)r_{G_2}}{(l-l_2)(l_1-l_2)(l_2)}$$

Applying Eq. (27), the distribution of the bending moment along BHA or any section of the drill string on which the two sensor packages have been installed is given by:

$$M(z) = EI\left\{6\left[\frac{-r_{G_1}}{(l-l_1)(l_1)(l_1-l_2)} + \frac{r_{G_2}}{(l-l_2)(l_1-l_2)(l_2)}\right]z + 2\left[\frac{(l+l_2)r_{G_1}}{(l-l_1)(l_1)(l_1-l_2)} + \frac{(l+l_1)r_{G_2}}{(l-l_2)(l_2)(l_2-l_1)}\right]\right\} \quad (30)$$

In order to process data from two or more sensors it can be desirable to take into account the times at which data is acquired by each sensor. In some embodiments each sensor is associated with a clock. For example a clock may be provided in each sensor package. Information from each sensor may then be tagged with clock time of each sensor package (e.g. $r_{G1}$ & $t_1$, and $r_{G2}$ & $t_2$) and data is passed to the processor for calculations. This ensures that synchronous measurements are processed.

The information from one or more sensor packages can be used to control sliding, identify unreliable surveys, and/or check the quality of the wellbore by calculating the real-time curvature of the BHA (or any other desired part of the drill string). The real-time curvature can be obtained at each survey point (or any other desired measurement point) by rotating the drill string at a preferably constant RPM. Rotation of the drill string allows calculation of the parameter $r_G$ which is subsequently used to calculate curvature. For instance, if one sensor package may be used to calculate curvature (this can be done assuming a quadratic shape for deflection of the drill string as explained above), then curvature can be determined by the following equation:

$$\frac{1}{\rho} = \frac{8 r_G}{l^2}$$

where $$\frac{1}{\rho}$$

is the curvature (in rad/m) of the drill string and l is defined with reference to FIG. 11.

If two sensor packages are used (and a cubic form is assumed for the deflection of the drill string), then curvature is given by:

$$\frac{1}{\rho_i} = 6 a z_i + 2b, \quad i = 1, 2$$

wherein constants a and b are obtained according to Eq. (29) (see also FIG. 11).

It is common in the drilling industry to use the term dog-leg severity (or "DLS") instead of curvature (in rad/m). DLS is generally expressed in degrees per 30 meters or 100 ft. The following conversion can be used to convert the real-time curvature to real-time dog-leg severity:

$$DLS_R = \frac{1}{\rho} \times \frac{180}{\pi} \times 30$$

where $DLS_R$ is the real-time dog-leg severity.

$DLS_R$ can be compared against well-plan DLS (or $DLS_W$), to control sliding. For example, if $DLS_R$ is close to $DLS_W$, one can conclude that the sliding path is following the designed path. On the other hand, if $DLS_R$ is greater than $DLS_W$, one may conclude that less bending moment at bit is required to bring the wellbore to its intended path. If $DLS_R$ is smaller than $DLS_W$ one may conclude that more bending moment at bit is required to bring the wellbore to its intended path.

Moreover, $DLS_R$ can be compared against survey-calculated DLS (or $DLS_S$), to verify surveys. For example, if $DLS_R$ is close to $DLS_S$ one may conclude that survey data is reasonable since it yields the same results as independent measurements of curvature. On the other hand, if $DLS_S$ deviates significantly from $DLS_R$, one may reject the survey data and acquire a new set of survey parameters or apply survey correction techniques to survey data.

Optionally, a result of the comparison of $DLS_R$ with $DLS_W$ may be presented to a user (e.g. an operator of drill rig 10) using, for example, displays 200. In some embodiments, processor 24 may render graphical representations of the sliding path relative to the designed path. Alternatively, or in addition, processor 24 may render textual or symbolic representations of the comparison. For example, the results of the comparison may be displayed as a numeric percentage value representative of a value $DLS_R$ corresponds with, or deviates from, $DLS_W$. In some embodiments, a warning indication, e.g. via a light-emitting element, an audio element, etc. is generated when $DLS_R$ deviates from $DLS_W$ by more than an acceptable threshold value. In some embodiments, processor 24 automatically adjusts one or more of WOB or hook load, top drive RPM, mud flow, top drive oscillation, top drive quill position, etc. based on the comparison of $DLS_R$ with $DLS_W$.

The real-time curvature of the drill string may be used to predict inclination and azimuth of the wellbore at the next survey point (or any other desired point with a known distance from the current survey point). For example, if we assume that two consecutive survey points lie on the surface of a sphere (i.e. minimum curvature method), and have an inclination at the current survey point i, and a measured depth $MD_i$ between the current survey point and the next survey point i+1, inclination at survey point i+1 can be predicted as:

$$Inc_{i+1} = Inc_i + \frac{MD_i}{\rho} \times \cos(TF)$$

where $$\frac{1}{\rho}$$

is the real-time curvature and TF is the highside Toolface or top drive quill position, where quill position is the angel of rotation of the top drive quill.

Similarly, azimuth at survey point i+1 can be predicted as:

$$Azm_{i+1} = Azm_i + \cos^{-1}\left(\frac{\cos\left(\frac{MD_i}{\rho}\right) - \cos^2(Inc_i)}{\sin^2(Inc_i)}\right) \times \sin(TF)$$

where Azm is wellbore azimuth (derivations of these formulas are illustrated in the images below).

The predicted values of inclination and azimuth are of particular importance since the drill operator can use these values to adjust drilling parameters to stay on-course (especially for sliding). This has clear advantages over current practices in which the drill operator has to correct the deviated well path after the deviation has already happened since only real measurements of inclination and azimuth (as opposed to predicted values) are available.

For example, consider the case where it is desired to achieve a particular build rate (change in inclination over a specified distance) with inclination measured relative to a vertical plane. Having the real-time curvature of the wellbore from sensor packages close to the bit, the predicted values of inclination and azimuth at the next survey point located e.g. 30 ft (approximately 10 metres) from the current survey point may be calculated as:

$$\begin{cases} Inc_{i+1} = Inc_i + \dfrac{30}{\rho} \\ Azm_{i+1} = Azm_i \end{cases}$$

Having the target values of inclination and azimuth from well plan data, a driller (or an automated system) can adjust drilling parameters to meet the target values. For instance, if the predicted inclination is greater than the target inclination, one may reduce the weight on bit to relax the curvature of the BHA to decrease inclination.

Calculations of predicted parameters such as inclination and azimuth can be performed downhole, if values of measured depth are downlinked to or otherwise available to the downhole system (since this is the only parameter required for such calculations that is typically measured at the surface). Alternatively, values of curvature can be transmitted to the surface and computations can be done at the surface. Optionally, results of the computations may be displayed to a user (e.g. a drill rig operator) using for example, displays 200. For example, values of inclination and azimuth may be displayed numerically. Alternatively, or in addition, a graphical representation of the drill string having the computed values of inclination and azimuth may be rendered. Optionally, such displays may compare such results to desired or design values for the predicted parameters.

To demonstrate how directional parameters can be obtained from real-time curvature estimates, consider the following case, with reference to FIG. 12, for the prediction of inclination at a next survey point. One can consider the well profile in the plane of zero toolface (gravity) or maximum change in inclination, during sliding. Taking $Inc_i$ as the inclination at survey point i, and $Azm_i$ as the azimuth at the survey point i, the objective is to find $(Inc)_{i+1}$ having $(DLS)_R$ from first and second sensors 22A and 22B. $(DLS)_R$ may be calculated from the equations above. Assuming points i and i+1 lie on a sphere (i.e. in accordance with the minimum curvature method) with radius $\rho$ which can be $\rho_1$ (if only one sensor is used) or $(\rho_1+\rho_2)/2$ if two sensors are used, then the change in inclination from the survey point i to i+1 in this plane is:

$$(Inc)_{i+1} = \dfrac{(MD)_i}{\rho},$$

where (MD) is the measured depth from i to i+1.

For every plane with a different tool face, the change in inclination is calculated as:

$$(Inc)_{i+1} = (Inc)_i + \dfrac{(MD)_i}{\rho}\cos(TF), \quad (31)$$

where TF is the tool face (gravity).

Consider the following case for the prediction of azimuth at the next survey point, with reference to FIG. 13. If we consider the well profile in the plane of 90° TF (or maximum change in azimuth), then the objective is to find $(Azm)_{i+1}$ having $(DL)_R$. Using the minimum curvature method, then:

$$\dfrac{(MD)_i}{\rho} = \cos^{-1}(\sin(Inc)_i \sin(Inc)_{i+1}\cos((Azm)_i - (Azm)_{i+1}) + \cos(Inc)_i \cos(Inc)_{i+1}) =$$
$$\cos^{-1}(\sin^2(Inc)_i \cos((Azm)_i - (Azm)_{i+1}) + \cos^2(Inc)_i)$$

and solving for $(Azm)_{i+1}$:

$$(Azm)_{i+1} = (Azm)_i + \cos^{-1}\left(\dfrac{\cos\dfrac{(MD)_i}{\rho} - \cos^2(Inc)_i}{\sin^2(Inc)_i}\right)\sin(TF) \quad (32)$$

This represents the change in azimuth in any plane, based on information from the survey point i and the sensor packages. Therefore, using $(Inc)_i$, $(Azm)_i$, $(TF)_i$ and $\rho$ from the sensor packages, $(Inc)_{i+1}$ and $(Azm)_{i+1}$ (inclination and azimuth at the next survey point) can be predicted using equations (31) and (32) above.

Figure 9:
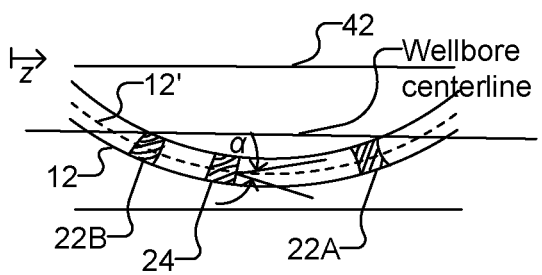
FIG. 9 illustrates an example of drill string sag during horizontal drilling.

The information from multiple sensor packages also can be utilized to calculate certain errors in directional surveying parameters. For instance, in order to determine errors in inclination resulting from drill string sag (deflection due to weight of the drill string which can happen particularly in horizontal drilling), one can rotate the drill string at a nearly constant RPM prior to taking static surveys. The data acquired from two or more sensor packages (with at least one sensor located on top of the surveying package and one located on the bottom of the surveying package, as illustrated in FIG. 9) can be processed in the same manner as explained in the above paragraphs to determine the deflection of the drill string. For instance, if two sensors are used, deflection of the string can be approximated as:

$$W(z) = az^2 + bz + c$$

where W(z) is the deflection of the drill string, and a, b, and c are constants. The misalignment between the axial axis of the surveying instrument and the axis of the wellbore can be approximated as the slope of the bending curve:

$$\alpha(z) = \dfrac{dW(z)}{dz} = 2az + b$$

and corrected inclination can be estimated as:

$$Inc_{cor} = Inc_{meas} - \alpha$$

where $Inc_{cor}$ is the corrected inclination and $Inc_{meas}$ is the inclination measured by the surveying instrument.

FIG. 9 illustrates drill string sag. The error in measurement of inclination of the wellbore due to sagging of the drill string within the wellbore can be calculated using data from sensor packages. This is important in horizontal drilling where sag tends to be more pronounced. Taking $\alpha$ as the misalignment between the axis of surveying instrument (which is assumed to be parallel to the drill string center line) and the well bore center line, then, assuming that deflection $W(z)=az^2+bz+c$, then $\alpha(z)=dW(z)/dz=2az+b$, where a, b and c are determined as explained above (see Equation (29)). The inclination of the well bore $(Inc)_{actual} = (Inc)_{measured} - \alpha(z_o)$ where $z_o$ is the location of the surveying instrument. To calculate a, b and c, the drill string is rotated preferably at a constant RPM (to calculate $r_{G1}$ and $r_{G2}$). For example, where $z=0$, $W(z)=0$, $z=(I_1)$, $W(I_1)=r_{G1}$, $z=I_2$, $W(I_2)=r_{G2}$ then solving for a, b, and c:

$c = 0$, $$a = \frac{1}{(l_1^2 l_2 - l_2^2 l_1)}(l_2 r_{G1} - l_1 r_{G2})$$

$$b = \frac{1}{(l_1^2 l_2 - l_2^2 l_1)}(-l_2^2 r_{G1} + l_1^2 r_{G2})$$

Thus, for $\alpha(z) = 2az + b$, $(Inc)_{actual} = (Inc)_{measured} - \alpha(l)$.

As another example, multiple sensor packages installed along the drill string may be used to monitor the structural integrity of the drill string (e.g. to monitor for conditions which could lead to detrimental events such as twist-offs). For instance, if two sensor packages are installed in the drill string (with a known relative distance between them), the parameter Ø can be used as an indicator of the relative twist in the drill string:

$$\Delta \emptyset_l(t) = \frac{\emptyset_1(t) - \emptyset_2(t)}{L}$$

where $\Delta \emptyset_l(t)$ is the angle of twist per unit length at time t between sensor package one and two, $\emptyset_1(t)$ and $\emptyset_2(t)$ are the total rotation of drill string at time t at spatial points one and two, respectively, and L is the distance between the two sensor packages. $\Delta \emptyset_l(t)$ can be used as a measure of the "differential torque", applied to the section of drill string between sensor packages one and two, which can be used to predict events such as twist-offs and torsional fatigues of the string. For instance, a 6.5"/3.5" (OD/ID) drill collar is usually subjected to angle of twists less than 0.03° per unit length in a normal drilling practice (which is equivalent to a maximum torque magnitude of ~20,000 ft.lb). Therefore, values of $\Delta \emptyset_l(t)$ greater than this magnitude can be an indicator of potential twist-offs. Alternatively, the number of events for which $\Delta \emptyset_l(t)$ exceeds a pre-set threshold can be recorded in the downhole system to provide an estimate of the fatigue life of the string (or the remaining life of the string before it fails). In some embodiments a system as described herein computes and maintains a log of values of $\Delta \emptyset_l(t)$ and/or a measure of fatigue or fatigue life determined from values of $\Delta \emptyset_l(t)$.

It is also possible to estimate the magnitude of the differential torque applied to the string between the two sensor packages as follows:

$$\Delta T(t) = GJ \Delta \emptyset_l(t)$$

where G is the shear modulus of the string, J is its polar moment of inertia, and $\Delta \emptyset_l(t)$ is calculated from the equation described above.

Figure 7:
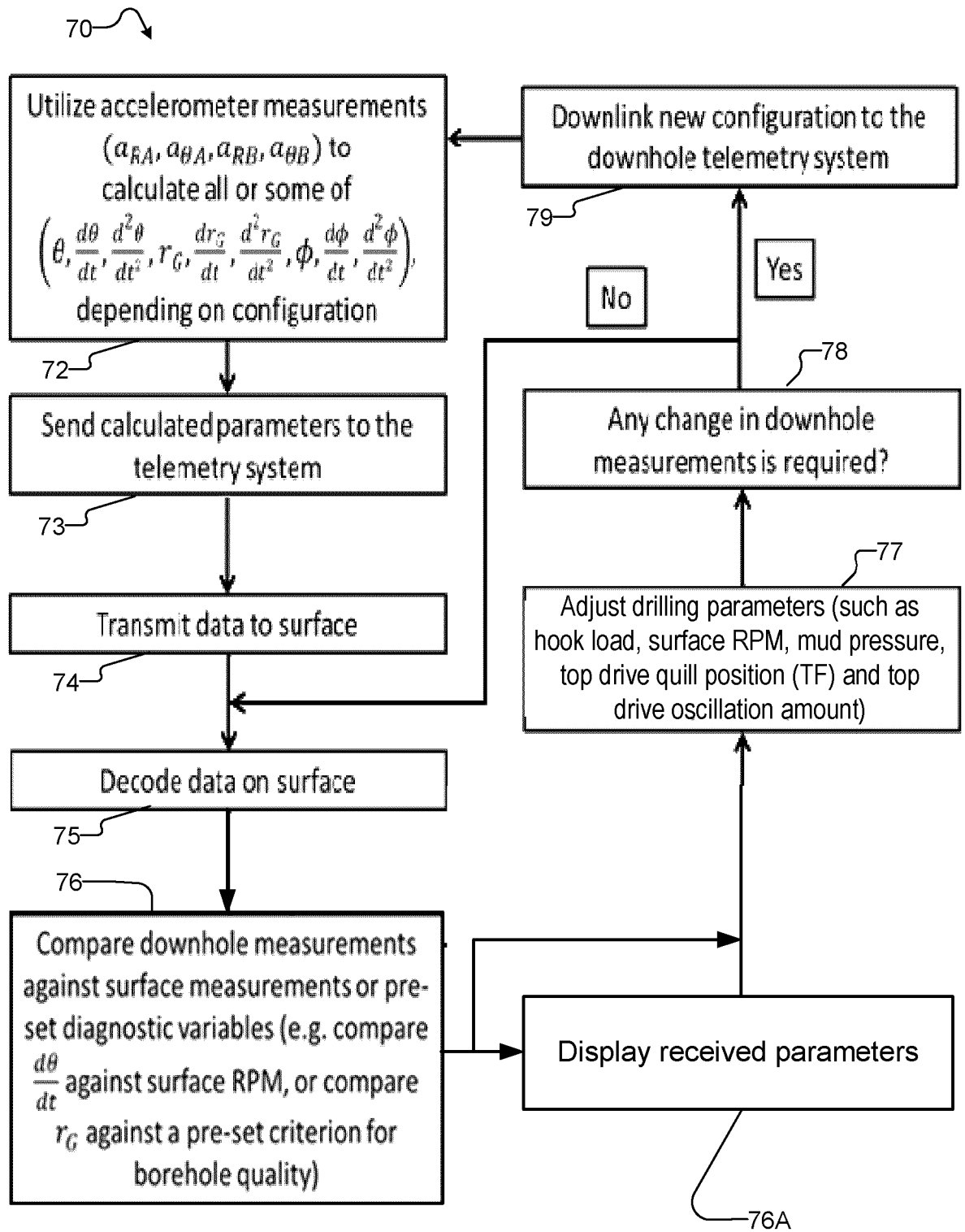
FIG. 7 shows an example method by way of which the selection of parameters transmitted to surface equipment and/or the rate at which selected parameters are transmitted to the surface equipment may be varied according to one embodiment.

FIG. 7 shows an example method 70 by way of which the selection of parameters transmitted to surface equipment and/or the rate at which selected parameters are transmitted to the surface equipment may be varied to provide parameters relevant during different phases of a drilling operation. Method 70 begins at block 72 by taking accelerometer measurements (such as $a_{RA}$, $a_{\theta A}$, $a_{RB}$, and $a_{\theta B}$) and using these to calculate at least some or all of certain parameters such as ($\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2}).$$

The calculated parameters determined at block 72 are sent to the telemetry system at block 73. The data is transmitted to surface, at block 74, where it is decoded, at block 75. At block 76, the downhole measurements are compared against surface measurements and/or preset diagnostic variables. For example, $d\theta/dt$ may be compared against surface RPM, or $r_G$ may be compared against a pre-set criterion for borehole quality. Other downhole measurements as described herein can be compared against surface measurements or preset diagnostic variables.

At block 76A, the downhole measurements are optionally displayed to a drill rig operator using, for example, displays 200. In some embodiments, graphical representations of the downhole measurements and/or the comparisons of the downhole measurements against the surface measurements and/or preset diagnostic variables (e.g. block 76) are rendered. For example, results relating to whirl of drill string 12 may be used to display a graphical representation of drill string 12 revolving, with a speed and path corresponding to that of drill string 12, within a graphical representation of a wellbore. Alternatively, or in addition, results may be presented to a user textually (e.g. a numeric value of whirl of drill string 12) or symbolically (e.g. with an ascending arrow if whirl of drill string 12 is increasing, with a curved arrow indicating direction of whirl of drill string 12, etc.).

At block 77, the drilling parameters are adjusted based on the comparison at block 76. For example, adjustments can be made to one or more of: the hook load, surface RPM, mud pressure, top drive quill position (TF), top drive oscillation amount, etc. At block 78, the method proceeds by determining whether any change or adjustment in downhole measurements is required based on the adjusted drilling parameters. If not, then the method proceeds to block 75 (decoding data on the surface). Otherwise, if a change in downhole measurements is required, then the new configuration for taking the downhole measurements is downlinked to the downhole telemetry system at block 79, and the method proceeds to block 72 and continues onto the next steps as described above. The comparisons and adjustments performed at blocks 76, 77 and 78 can be performed in accordance with one or more of the methods as already described herein including manually by a drill rig operator.

In some embodiments a dedicated telemetry channel is provided for communications between a downhole system that functions as described herein and surface equipment. Such a dedicated telemetry channel may, for example, carry data that provides feedback in a closed loop control system. Feedback in the form of parameters that directly or indirectly indicate efficiency of drilling may be transmitted to the surface equipment. Feedback in the form of signals indicating changes in the selection of parameters to be transmitted and/or the rate at which the parameters should be transmitted may be provided to the downhole system by downlink telemetry. The dedicated telemetry channel may be configured so that it does not interfere with operations of a main telemetry system. A separate transmission channel also eliminates any interruptions in the operations of the main telemetry system. The dedicated telemetry channel may, for example, be provided by an EM telemetry system operated at a frequency distinct from that of other EM telemetry channels.

Calculations for the parameters at block 72 of method 70 (FIG. 7) can be done in at least two methods:
1. Instantaneous calculation of ($\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2})$$

which requires a high density data acquisition of acceleration fields (i.e. accelerometers stream data continuously and the processor downhole performs calculations almost real-time). In this method, sending ($\alpha_{RA}$, $\alpha_{\theta A}$, $\alpha_{RB}$, $\alpha_{\theta B}$) is difficult due to limitations on data rate in typical downhole telemetry systems. The type of output and frequency in which any of calculated ($\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2})$$

is sent to surface is configurable by the user. For example, the rotational speed of the drill string can be sent to surface every 10 seconds, or a flag can be sent to surface when the difference between the maximum and average of $$\frac{d\theta}{dt}$$

(over a set time window, e.g. 5 seconds) is above a set threshold.

2. Perform calculations in a slower fashion which can be done by sending the acceleration fields ($a_{RA}$, $a_{\theta A}$, $a_{RB}$, $a_{\theta B}$) to surface on a periodic basis and processing calculations on surface. This will allow more flexibility but at the cost of limited accuracy due to fewer data points for output variables ($\theta$, $$\frac{d\theta}{dt}, \frac{d^2\theta}{dt^2},$$

$r_G$, $$\frac{dr_G}{dt}, \frac{d^2 r_G}{dt^2},$$

$\phi$, $$\frac{d\phi}{dt}, \frac{d^2\phi}{dt^2})$$

The frequency at which acceleration fields are transmitted to the surface may be configurable (up to a maximum limited by telemetry rate).

Figure 10:
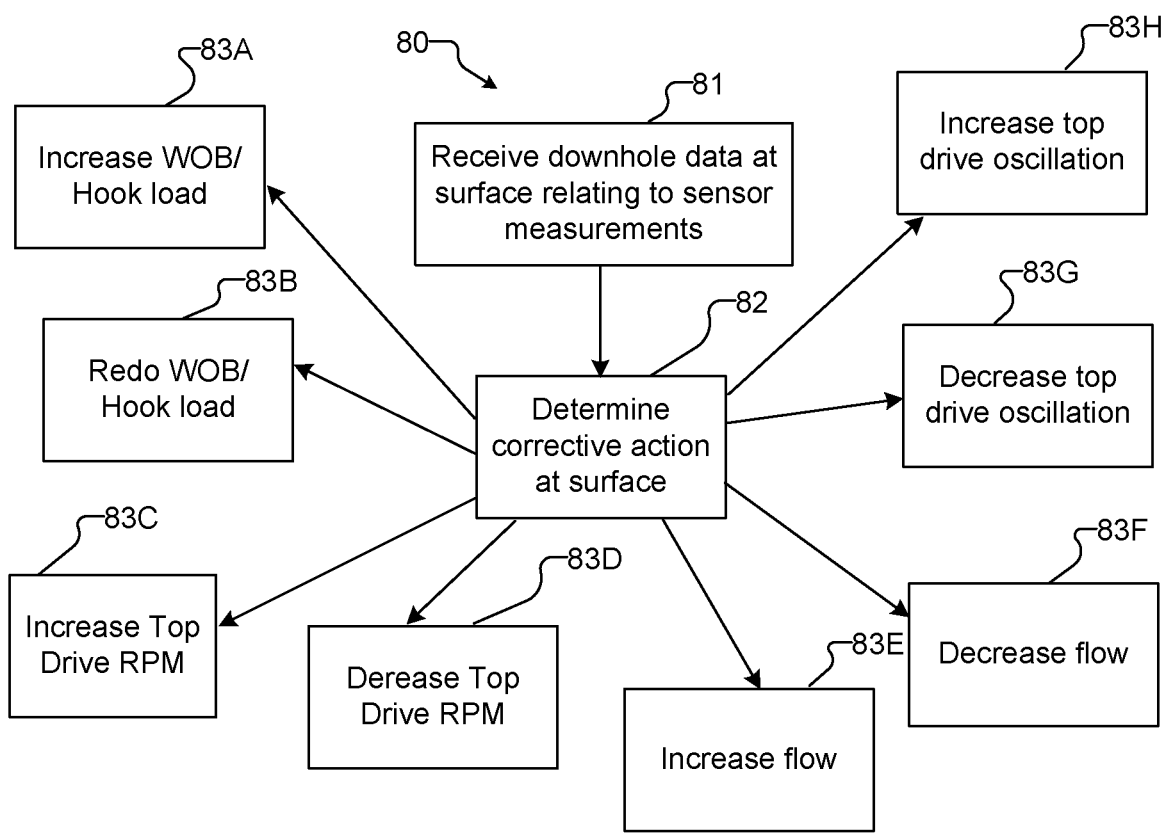
FIG. 10 illustrates different exemplary corrective actions that can be made based on downhole data measurements received at the surface.

FIG. 10 illustrates a method 80 for determining different corrective actions based on downhole data measurements received at the surface. Method 80 commences at block 81 by receiving downhole data at the surface relating to one of a number of measurements. At block 82, the method determines corrective action based on the measurements received at block 81. The corrective actions that are performed may include, for example: increasing the WOB or hook load (block 83A), reducing the WOB or hook load (block 83B), increasing top drive RPM (block 83C), decreasing the top drive RPM (block 83D), increasing flow (block 83E), decreasing the flow (block 83F), decreasing top drive oscillation (block 83G), or increasing top drive oscillation (block 83H) (collectively block 83). The determination and performance of the corrective actions at blocks 82 and 83 may be based on one or more of the methods as already described herein.

Figure 14:
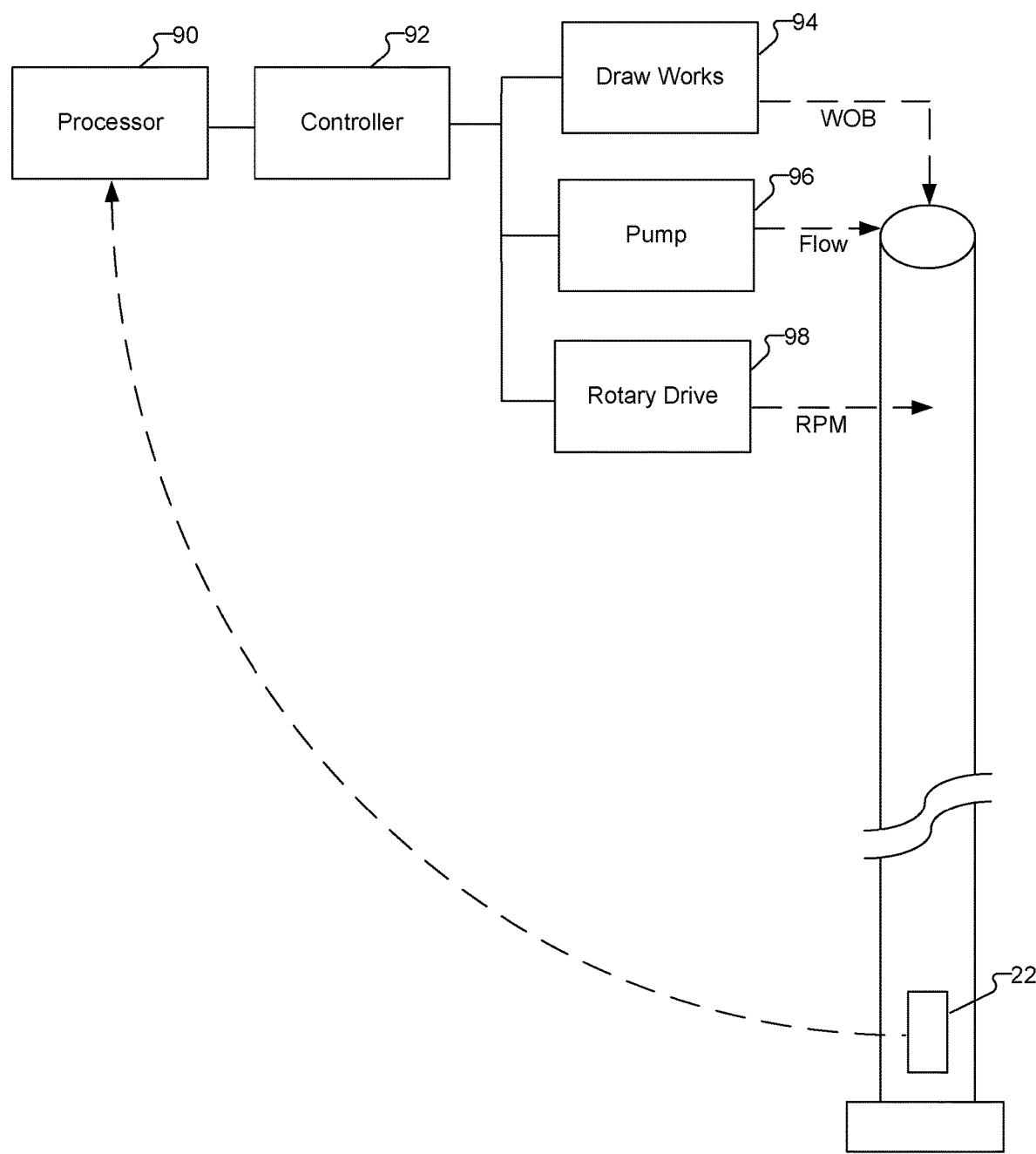
FIG. 14 schematically illustrates a system for controlling one or more parameters of a drilling operation using feedback from a downhole system.

FIG. 14 schematically illustrates an example system for controlling various components of a drill rig to control aspects of a drilling operation based on downhole data measurements received at a processor. Processor 90 is in communication with sensors 22 and controller 92. Controller 92 is in communication with draw works 94, pump 96, and rotary drive 98. Draw works 94 controls WOB and hook load. Pump 96 controls the flow rate. Rotary drive 98 controls the RPM and oscillation of a drill string. Processor 90 may implement one or more of the methods as described herein to determine desired adjustments to drilling parameters. Processor 90 then communicates the adjustments required to controller 92, which adjusts the operation of the draw works 94, pump 96, and/or rotary drive 98 to make the required adjustments. In some embodiments, the adjustments may make corrections to avoid or reduce or manage potentially damaging conditions such as whirl.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof; elements which are integrally formed may be considered to be connected or coupled;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using processors that comprise specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a computer system for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times or in different sequences.

Embodiments of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g. EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Where a record, field, entry, and/or other element of a database is referred to above, unless otherwise indicated, such reference should be interpreted as including a plurality of records, fields, entries, and/or other elements, as appropriate. Such reference should also be interpreted as including a portion of one or more records, fields, entries, and/or other elements, as appropriate. For example, a plurality of "physical" records in a database (i.e. records encoded in the database's structure) may be regarded as one "logical" record for the purpose of the description above and the claims below, even if the plurality of physical records includes information which is excluded from the logical record.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments are discussed herein, those of skill in the art will recognize certain modifications, permutations, additions and sub-combinations thereof. For example:

Acceleration sensors may be arranged with axes of measurement aligned in directions other than those described above (e.g. sensors 22A and 22B may be rotated with respect to the cross section of the drill string). In such embodiments transformations may be performed on the sensor readings to obtain measurements that may be applied as described above. In general, acceleration measurements suitable for use as described herein may be obtained with arbitrarily-oriented three-axis accelerometers by performing transformations on the outputs of such accelerometers.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions and sub-combinations as are within their true spirit and scope.

What is claimed is:

1. A drilling system comprising:
    a plurality of sensors mounted to a drill string at a plurality of sensor locations, the sensors configured to sense a plurality of acceleration measurements corresponding to a plurality of locations in a first two-dimensional reference frame, the first two-dimensional reference frame coincident with a plane orthogonal to a rotational axis of the drilling system and based on a position of the drilling system in the plane, the plurality of acceleration measurements comprising measurements in a plurality of non-parallel directions lying in the plane;
    a processor in communication with the plurality of sensors, the processor configured to:
        receive the plurality of acceleration measurements;
        determine a rotational position of the drilling system in the first two-dimensional reference frame based on the plurality of acceleration measurements, the rotational position describing rotation of the drilling system in the plane about the rotational axis;
        convert a first location of the plurality of locations to a corresponding second location of the drilling system in a second two-dimensional reference frame based on the plurality of acceleration measurements, the second two-dimensional reference frame coincident with the plane and invariant with the position of the drilling system in the plane;
        determine a revolution position of the drilling system in the second two-dimensional reference frame based on the rotational position and the second location, the revolution position describing revolution of the drilling system in the plane about a revolution axis; and
        identify a whirl dynamic of the drilling system based on the revolution position;
    wherein the processor being configured to determine a rotational position comprises the processor being configured to:
        determine a rotational velocity of the drilling system in the first two-dimensional reference frame based on the plurality of acceleration measurements; and
        determine the rotational position based on the rotational velocity;
    wherein the first location comprises a first sensor location of the first sensor, a first measurement subset of the plurality of acceleration measurements are sensed by the first sensor, the first sensor location spaced apart from the rotational axis by a first radius $R_A$; and
    wherein a second measurement subset of the plurality of acceleration measurements are sensed by a second sensor, the second sensor having a second sensor location spaced apart from the rotational axis by a second radius $R_B$ and spaced apart from the first sensor location.

2. A drilling system according to claim 1 wherein the processor being configured to convert the first location in the first two-dimensional reference frame to the corresponding second location in the second two-dimensional reference frame comprises the processor being configured to:
    determine a converted plurality of acceleration measurements in the second two-dimensional reference frame based on the first location and the rotational position; and
    determine the second location in the second two-dimensional reference frame based on at least one of the plurality of locations and the converted plurality of acceleration measurements.

3. A drilling system according to claim 2 wherein:
    the processor being configured to convert the first location in the first two-dimensional reference frame to the corresponding second location in the second two-dimensional reference frame comprises the processor being configured to determine a planar velocity in the second two-dimensional reference frame, the planar velocity corresponding to the second location and based on the converted plurality of acceleration measurements; and
    the processor being configured to determine the second location comprises the processor being configured to determine the second location based on the planar velocity.

4. A drilling system according to claim 1 wherein the processor is configured to determine a rotational acceleration in the first two-dimensional reference frame based on the rotational velocity.

5. A drilling system according to claim 1 wherein the processor being configured to identify the whirl dynamic comprises the processor being configured to identify the whirl dynamic based on the revolution velocity and wherein the processor is further configured to determine the revolution velocity of the drilling system in the second two-dimensional reference frame based on the revolution position.

6. A drilling system according to claim 5 wherein the processor being configured to identify the whirl dynamic comprises the processor being configured to identify the whirl dynamic based on a revolution acceleration and wherein the processor is configured to determine the revolution acceleration of the drilling system in the second two-dimensional reference frame based on the revolution velocity.

7. A drilling system according to claim 1 wherein:
the first sensor location is radially offset from the second sensor location by 90° relative to the rotational axis;
the first measurement subset comprises a first radial acceleration measurement $\alpha_{RA}$ along a first measurement axis parallel to the first radius $R_A$ and a first tangential acceleration measurement $\alpha_{\theta A}$ along a second measurement axis orthogonal to the first measurement axis; and
the second measurement subset comprises a second radial acceleration measurement $\alpha_{RB}$ along a third measurement axis parallel to the second measurement axis and a second tangential acceleration measurement $\alpha_{\theta B}$ along a fourth measurement axis parallel to the first measurement axis.

8. A drilling system according to claim 7 wherein the processor being configured to determine the rotational position comprises the processor being configured to determine the rotational position at a time $t_n$ based on an incremental change in the rotational position since a prior time $t_{n-1}$ and a prior rotational position corresponding to the prior time $t_{n-1}$.

9. A drilling system according to claim 8 wherein the rotational velocity comprises an angular rotational velocity $d\theta/dt$ and the processor being configured to determine the rotational velocity comprises the processor being configured to determine the angular rotational velocity $d\theta/dt$ based on:

$$\left(\frac{d\theta}{dt}\right)^2 = \frac{-(a_{RA} - a_{\theta B})R_A + (a_{\theta A} - a_{RB})R_B}{R_A^2 + R_B^2}.$$

10. A drilling system according to claim 9 wherein:
the rotational position corresponding to the time $t_n$ comprises an angular rotational position $\theta(t_n)$, the prior rotational position comprises a prior angular rotational position $\theta(t_{n-1})$, and the drilling system comprises the processor being configured to determine the angular rotational position $\theta(t_n)$ based on:

$$\theta(t_n) = \frac{1}{2}\left[\frac{d\theta}{dt}(t_n) + \frac{d\theta}{dt}(t_{n-1})\right](t_n - t_{n-1}) + \theta(t_{n-1})$$

wherein $$\frac{d\theta}{dt}(t_n)$$

is the angular rotational velocity corresponding to the time $t_n$ and $$\frac{d\theta}{dt}(t_{n-1})$$

is the angular rotational velocity corresponding to a time $t_{n-1}$.

11. A drilling system according to claim 10 wherein the second two-dimensional reference frame comprises a first axis X and a second axis Y orthogonal to the first axis and the converted plurality of acceleration measurements comprise:
a first converted measurement $(\alpha_A)_X$ comprising a projection of the first measurement subset onto the first axis X; and
a second converted measurement $(\alpha_A)_Y$ comprising a projection of the first measurement subset onto the second axis Y.

12. A drilling system according to claim 10 wherein the processor is further configured to:
determine the first converted measurement $(\alpha_A)_X$ based on:

$$(\alpha_A)_X = \alpha_{RA} \cos\theta - \alpha_{\theta A} \sin\theta; \text{ and}$$

determine the second converted measurement $(\alpha_A)_Y$ based on:

$$(\alpha_A)_Y = \alpha_{RA} \sin\theta + \alpha_{\theta A} \cos\theta.$$

13. A drilling system according to claim 10 wherein the second location comprises a first coordinate $X_A$ on the first axis X and a second coordinate $Y_A$ on the second axis Y; and wherein the processor being configured to determine a revolution position comprises the processor being configured to determine a revolution radius $r_G$ and a revolution angle $\phi$ based on the first and second coordinates.

14. A drilling system according to claim 13 wherein the processor being configured to determine the revolution radius $r_G$ comprises the processor being configured to determine the revolution radius $r_G$ based on:

$$r_G = \sqrt{(Y_A \sin\theta + X_A \cos\theta - R_A)^2 + (Y_A \cos\theta - X_A \sin\theta)^2}.$$

15. A drilling system according to claim 13 wherein the processor being configured to determine the revolution angle $\phi$ comprises the processor being configured to determine the revolution angle $\phi$ based on:

$$\phi = \theta - \sin^{-1}\left[\frac{Y_A \cos\theta - X_A \sin\theta}{r_G}\right].$$

16. A drilling system according to claim 1 wherein the first and second sensors are housed by a drill collar proximate to a drill bit of the drilling system.

17. A drilling system according to claim 1 wherein the processor is configured to determine values for an estimate of forces applied to a drill bit or string of the drilling system or one or more of the friction, torque and drag between the drill bit or string and a surrounding formation, based at least in part on the plurality of acceleration measurements.

18. A drilling system according to claim 17 comprising an automated controller configured to apply the values to adjust the weight on bit of the drilling system to reduce the whirl dynamic.

19. A drilling system according to claim 17 comprising an automated controller configured to apply the values to adjust the top drive RPM of the drilling system to reduce the whirl dynamic.

20. A drilling system according to claim 17 comprising an automated controller configured to apply the values to adjust mud flow of the drilling system to reduce the whirl dynamic.

21. A drilling system according to claim 17 comprising an automated controller configured to apply the values to adjust the top drive oscillation of the drilling system to reduce the whirl dynamic.

22. A drilling system according to claim 1 wherein the processor is configured to control an at-surface drilling pipe position, based on one or more of the rotational position and revolution position, while the drilling rig is conducting a sliding drilling operation, by oscillating the drilling pipe at surface back and forward in equal incremental angles clockwise and counter-clockwise until the processor determines a non-zero rotational position or non-zero revolution position.

23. A drilling system comprising:
- a first sensor mounted to a drill string of the drilling system at a first sensor location in a plane orthogonal to a rotational axis of the drilling system, the first sensor configured to sense a first acceleration measurement comprising a first radial acceleration measurement $\alpha_{RA}$ along a first measurement axis parallel to the first radius $R_A$ and a first tangential acceleration measurement $\alpha_{\theta A}$ along a second measurement axis orthogonal to the first measurement axis;
- a second sensor mounted to the drill string of the drilling system at a second sensor location in the plane, the second sensor location spaced apart from the rotational axis by a second radius $R_B$ and spaced apart from the first sensor location in the plane, the second sensor configured to sense a second acceleration measurement comprising a second radial acceleration measurement $\alpha_{RB}$ along a third measurement axis parallel to the second measurement axis and a second tangential acceleration measurement $\alpha_{\theta B}$ along a fourth measurement axis parallel to the third measurement axis; and
- a processor in communication with the first and second sensors, the processor configured to identify a downhole dynamic of the drilling system based on the first and second acceleration measurements.

24. A drilling system according to claim 23 wherein the first and second sensors are configured to sense the first and second acceleration measurements in a first two-dimensional reference frame coincident with the plane and based on a position of the drilling system in the plane; and wherein the processor is further configured to:
- convert the first sensor location to a corresponding converted location of the drilling system in a second two-dimensional reference frame based on the first and second acceleration measurements, the second two-dimensional reference frame coincident with the plane and invariant with the position of the drilling system in the plane; and
- determine a revolution position of the drilling system in the second two-dimensional reference frame based on the converted location, the revolution position describing revolution of the drilling system in the plane about a revolution axis;
- wherein the processor being configured to identify the downhole dynamic comprises the processor being configured to identify a whirl dynamic based on the revolution position.

* * * * *